United States Patent
Dohta

(10) Patent No.: US 8,401,815 B2
(45) Date of Patent: Mar. 19, 2013

(54) ORIENTATION CALCULATION APPARATUS AND STORAGE MEDIUM HAVING ORIENTATION CALCULATION PROGRAM STORED THEREIN

(75) Inventor: Takuhiro Dohta, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 631 days.

(21) Appl. No.: 12/511,379

(22) Filed: Jul. 29, 2009

(65) Prior Publication Data

US 2010/0286946 A1    Nov. 11, 2010

(30) Foreign Application Priority Data

May 8, 2009    (JP) ................... 2009-113323

(51) Int. Cl.
*G01C 9/00* (2006.01)
*G06F 17/00* (2006.01)
*G01P 21/00* (2006.01)

(52) U.S. Cl. .............. 702/150; 463/37; 73/1.38

(58) Field of Classification Search .......... 702/150, 702/33, 57, 66–67, 70–71, 81, 84, 127, 141, 702/151–153, 182–183, 188–189, 193; 73/1.37–1.38, 1.75–1.77, 1.79, 488, 492, 73/503.3, 504.02–504.03, 514.01–514.02; 463/37

See application file for complete search history.

(56) References Cited

U.S. PATENT DOCUMENTS

2007/0243931 A1    10/2007    Ohta et al. .............. 463/37
2009/0326847 A1 *  12/2009    Ohta ....................... 702/93

FOREIGN PATENT DOCUMENTS

JP    2007-282787    11/2007

OTHER PUBLICATIONS

Wieringen et al., Real-Time Signal Processing of Accelerometer Data for Wearable Medical Patient Monitoring Devices, Aug. 20-24, 2008, 30th Annual International IEEE EMBS Conference, Vancouver, British Columbia, Canada, pp. 2397-2400.*
Chiang et al., WiiStick: Enhancing Motion Recognition Capability for Wii Systems, 2009 IEEE, pp. 1445-1448.*
Harada et al., Portable Absolute Orientation Estimation Device with Wireless Network under Accelerated Situation, Apr. 2004, Proceedings of the 2004 IEEE International Conference on Robotics & Automation, New Orleans, LA, pp. 1412-1417.*

* cited by examiner

*Primary Examiner* — Toan Le
(74) *Attorney, Agent, or Firm* — Nixon & Vanderhye P.C.

(57) ABSTRACT

A game apparatus calculates an orientation of an input device including an acceleration sensor and a gyroscope based on at least acceleration data and angular rate data acquired from the input device. The game apparatus includes a reflection rate setting unit, a first orientation calculation unit, and a second orientation calculation unit. The reflection rate setting unit sets a reflection rate representing a degree by which an acceleration indicated by the acceleration data is reflected in the orientation. The first orientation calculation unit calculates the orientation of the input device based on the acceleration when the reflection rate is equal to or greater than a predetermined first threshold. The second orientation calculation unit calculates the orientation of the input device based on the angular rate when the reflection rate is less than a predetermined second threshold equal to or less than the first threshold.

25 Claims, 13 Drawing Sheets

Fig. 8

| STATE OF INPUT DEVICE | (A) REFLECTION RATE "s" IS HIGH (STATIC STATE) | (B) REFLECTION RATE "s" IS LOW (DYNAMIC STATE) | (C) REFLECTION RATE "s" IS MODERATE (TRANSITIONAL PERIOD) |
|---|---|---|---|
| ORIENTATION CALCULATION METHOD | GRAVITATIONAL VECTOR Vg IS CALCULATED BASED ON ACCELERATION VECTOR Va | PREVIOUS GRAVITATIONAL VECTOR Vg0 IS ROTATED BASED ON ANGULAR RATE $\omega$ | VECTOR Vg IS CALCULATED SO AS TO FALL BETWEEN ACCELERATION-BASED GRAVITATIONAL VECTOR Vg1 AND ANGULAR RATE-BASED GRAVITATIONAL VECTOR Vg2 |

ORIENTATION CALCULATION APPARATUS AND STORAGE MEDIUM HAVING ORIENTATION CALCULATION PROGRAM STORED THEREIN

CROSS REFERENCE TO RELATED APPLICATION

The disclosure of Japanese Patent Application No. 2009-113323, filed May 8, 2009, is incorporated herein by reference.

BACKGROUND AND SUMMARY

1. Technical Field

The technology presented herein relates to orientation calculation apparatuses and programs for calculating an orientation of an input device, and more particularly, the present technology relates to an orientation calculation apparatus and program for calculating an orientation based on an output from an acceleration sensor included in an input device.

2. Description of the Background Art

Conventionally, there have been proposed techniques for calculating an orientation of an input device based on an output from an acceleration sensor included in an input device. For example, in Patent Document 1 (Japanese Laid-Open Patent Publication No. 2007-282787), an orientation is calculated based on a value obtained by smoothing an acceleration detected by an acceleration sensor within a predetermined period. In Patent Document 1, by smoothing a detected acceleration, components related to movement of the input device are removed from the detected acceleration, so that the detected acceleration only includes components related to gravitational acceleration. As a result, the direction of gravity can be accurately calculated based on the output from the acceleration sensor, making it possible to accurately calculate an orientation of the input device.

In the orientation calculation method described in Patent Document 1, a process for smoothing an acceleration detected within a predetermined period is performed. The smoothing process requires a plurality of acceleration values for a predetermined period in the past, and therefore the method described in Patent Document 1, which involves the smoothing process, has limited responsiveness as to orientation calculation.

Therefore, a feature of an example embodiment presented herein is to provide an orientation calculation apparatus and program capable of calculating with high responsiveness an orientation of an input device based on an acceleration.

The present embodiment has the following features to attain the above. Here, the reference numerals, the supplementary description and the like in the parentheses indicate a correspondence with the embodiment described below in order to aid in understanding the present embodiment and are not intended to limit, in any way, the scope of the present embodiment.

The present embodiment is directed to an orientation calculation apparatus (game apparatus 3) for calculating an orientation of an input device (8) including an acceleration sensor (37) and an angular rate sensor (gyroscope 55, 56) based on at least acceleration data (64) and angular rate data (63) acquired from the input device. The orientation calculation apparatus includes reflection rate setting means (CPU 10 performing step S3; hereinafter, only step numbers will be indicated), first orientation calculation means (S5), and second orientation calculation means (S6). The reflection rate setting means sets a reflection rate (s) representing a degree by which an acceleration (acceleration vector Va) indicated by the acceleration data is reflected in the orientation. The first orientation calculation means calculates the orientation of the input device based on the acceleration indicated by the acceleration data when the reflection rate is equal to or greater than a predetermined first threshold (where the reflection rate s=1). The second orientation calculation means calculates the orientation of the input device based on an angular rate ($\omega$) indicated by the angular rate data when the reflection rate is less than a predetermined second threshold equal to or less than the first threshold (where the reflection rate s=0).

According to the above configuration, when the reflection rate is high (equal to or higher than the first threshold), the orientation of the input device is calculated based on the acceleration, and when the reflection rate is low (less than the second threshold), the orientation of the input device is calculated based on the angular rate. When it is not appropriate to calculate the orientation based on the acceleration, the orientation is calculated based on the angular rate, and therefore orientation calculation is possible even when the acceleration-based orientation calculation is not performed. Accordingly, it is possible to prevent deterioration in responsiveness due to no orientation being calculated during a period in which the acceleration-based orientation calculation is not performed, making it possible to calculate the orientation of the input device with high responsiveness.

Also, the second threshold may be less than the first threshold. In this case, the orientation calculation apparatus further includes third orientation calculation means (S7 shown in FIG. 10). The third orientation calculation means calculates the orientation of the input device so as to fall between the orientations calculated by the first and second orientation calculation means when the reflection rate is less than the first threshold and equal to or greater than the second threshold.

According to the above configuration, when the reflection rate is moderate (less than the first threshold and equal to or greater than the second threshold), the third orientation calculation means calculates the orientation considering both the first orientation based on the acceleration and the second orientation based on the angular rate. Here, during a transitional period in which the input device transitions between states where the reflection rate is high and where the reflection rate is low, there is a possibility that the orientation to be calculated might change suddenly due to a change of the orientation calculation method. On the other hand, according to the above configuration, the third orientation calculation means calculates the orientation during the transitional period, and therefore it is possible to prevent the orientation from changing suddenly due to any change of the orientation calculation method. Thus, it is possible to prevent the user from feeling unnatural about any sudden change in orientation, making it possible to improve operability of the input device.

Also, the third orientation calculation means may calculate the orientation of the input device as a weighted average of the orientations calculated by the first and second orientation calculation means, the weighted average being obtained based on a weight corresponding to the reflection rate (equation (5)).

According to the above configuration, the third orientation calculation means calculates the orientation of the input device using an acceleration-based orientation and an angular rate-based orientation at a ratio corresponding to the reflection rate. Accordingly, the orientation can be accurately calculated even during a transitional period in which the input device transitions between states where the reflection rate is high and where the reflection rate is low.

Also, the first threshold and the second threshold may be equal. In this case, the first orientation calculation means calculates the orientation of the input device when the reflection rate is equal to or greater than the first threshold. The second orientation calculation means calculates the orientation of the input device when the reflection rate is less than the first threshold (FIG. 11).

According to the above configuration, the orientation of the input device is calculated without fail by the first or second orientation calculation means regardless of the value of the reflection rate. That is, the orientation of the input device can always be calculated, and therefore it is possible to further improve responsiveness as to orientation calculation. Furthermore, when compared to the case where the third orientation calculation means is provided, the orientation calculation process can be simplified, resulting in increased processing speed.

Also, the orientation calculation apparatus may further include fourth orientation calculation means (step S7 shown in FIG. 12). The fourth orientation calculation means calculates the orientation of the input device so as to fall between the orientations calculated by the first and second orientation calculation means when the reflection rate is less than the first threshold and equal to or greater than the second threshold and is rising. The second orientation calculation means calculates the orientation of the input device based on the angular rate indicated by the angular rate data when the reflection rate is less than the second threshold or when the reflection rate is less than the first threshold and is falling.

According to the above configuration, when the reflection rate is moderate (less than the first threshold and equal to or greater than the second threshold) and is rising, the third orientation calculation means calculates the orientation considering both the first orientation based on the acceleration and the second orientation based on the angular rate. Here, during a transitional period in which the input device transitions from the state where the reflection rate is high to the state where the reflection rate is low, there is a possibility that the orientation might change suddenly due to a change of the orientation calculation method. On the other hand, according to the above configuration, the third orientation calculation means calculates the orientation during the transitional period, and therefore it is possible to prevent the orientation from changing suddenly due to any change of the orientation calculation method. Thus, it is possible to prevent the user from feeling unnatural about any sudden change in orientation, making it possible to improve operability of the input device.

Also, the reflection rate setting means may calculate the reflection rate based on the acceleration indicated by the acceleration data (equation (1)).

According to the above configuration, by using the acceleration data, the reflection rate can be readily calculated. Also, by referencing the acceleration data, the orientation calculation apparatus can estimate the degree of motion of the input device (whether at rest or in motion), and furthermore, the orientation calculation apparatus can determine the dependability for the acceleration indicated by the acceleration data (the degree representing whether or not the acceleration reliably represents the direction of gravity). In this manner, according to the above configuration, the dependability can be represented by the reflection rate, and therefore whether to calculate the orientation based on the acceleration or the angular rate can be determined in accordance with the dependability. Thus, it is possible to accurately calculate the orientation of the input device.

Also, the reflection rate setting means may calculate the reflection rate so as to be higher the lower the amount of change for the acceleration indicated by the acceleration data (equation (1)).

According to the above configuration, the reflection rate is calculated in accordance with the amount of change for the acceleration. By referencing the amount of change for the acceleration, the degree of motion of the input device can be accurately estimated, thereby accurately determining the dependability for the acceleration. Accordingly, by calculating the reflection rate in accordance with the amount of change for the acceleration, it becomes possible to appropriately set the reflection rate and thereby to accurately calculate the orientation of the input device.

Also, the reflection rate setting means may calculate the reflection rate so as to be higher the closer the magnitude of the acceleration indicated by the acceleration data is to the magnitude of a gravitational acceleration.

According to the above configuration, the reflection rate is calculated in accordance with the difference in magnitude between the acceleration and the gravitational acceleration. By referencing the difference in magnitude, the degree of motion of the input device can be accurately estimated, thereby determining the dependability for the acceleration. Accordingly, by calculating the reflection rate in accordance with the difference in magnitude, it becomes possible to appropriately set the reflection rate and thereby to accurately calculate the orientation of the input device.

Also, the reflection rate setting means may repeatedly calculate the reflection rate, and may correct the reflection rate so as to fall between a currently calculated reflection rate and a previously calculated reflection rate when the currently calculated reflection rate is higher than the previously calculated reflection rate (equation (2)).

According to the above configuration, when the reflection rate may rise, the increment of the reflection rate can be minimized by correction. Here, in some cases, the reflection rate calculated from the acceleration might temporarily rise while the input device 8 is being moved. In such a case, it is highly likely that in fact the acceleration does not accurately represent the direction of gravity, and therefore the reflection rate should be calculated as a lower value. On the other hand, according to the above configuration, when the reflection rate may temporarily rise, the reflection rate can be inhibited from rising by correction, and can be kept low. Thus, according to the above configuration, the reflection rate can be more accurately calculated to represent the dependability, making it possible to accurately calculate the orientation of the input device.

Also, the reflection rate setting means may determine a degree of motion of the input device based on operation data acquired from the input device, and may set the reflection rate so as to be lower the more vigorously the input device is moved.

According to the above configuration, the reflection rate is calculated to represent the degree of motion of the input device. As described above, the dependability for the acceleration indicated by the acceleration data can be determined based on the degree of motion of the input device. Thus, according to the above configuration, it is possible to appropriately set the reflection rate to represent the dependability, making it possible to accurately calculate the orientation of the input device.

Also, the angular rate sensor may be detachable from the input device. In this case, the reflection rate setting means determines whether or not the angular rate sensor is attached to the input device based on operation data acquired from the input device (S21), and sets the reflection rate in accordance with the determination result (S3 and S22 shown in FIG. 14).

According to the above configuration, the reflection rate is set to a different value depending on whether or not the input device has the angular rate sensor attached thereto. As a result, when the orientation calculation apparatus has no angular rate sensor attached thereto, the first orientation calculation means calculates the orientation based on the acceleration, and when the angular rate sensor is attached, the first and second orientation calculation means can be appropriately used for separate orientation calculations. Thus, the orientation calculation apparatus can address both cases where the angular rate sensor is attached or not attached.

Also, the first orientation calculation means may repeatedly calculate the orientation of the input device, and may calculate an orientation corresponding to a direction of gravity calculated as a weighted average of a direction of gravity corresponding to a previously calculated orientation and a direction of the acceleration, the weighted average being obtained based on a weight corresponding to the reflection rate (equation (3)).

According to the above configuration, the first orientation calculation means calculates the orientation of the input device considering the reflection rate, and therefore it is possible to more accurately calculate the orientation. Note that in the above configuration, if the reflection rate falls, the orientation becomes invariable, so that the orientation cannot almost be calculated. However, in the present embodiment, when the reflection rate is low, the orientation is calculated based on the angular rate, and therefore responsiveness as to orientation calculation does not deteriorate due to no orientation being calculated. In this manner, the present invention is effective especially when the orientation of the input device is calculated considering the reflection rate as in the above configuration.

Also, the present embodiment may be embodied as a computer-readable storage medium having stored therein an orientation calculation program (61) for causing a computer of an information processing apparatus to function as the respective means described above.

According to the present embodiment, when the acceleration-based orientation calculation is not performed, the angular rate-based orientation calculation is performed, thereby preventing responsiveness as to orientation calculation from deteriorating due to no orientation calculation being performed, so that the orientation of the input device can be calculated with high responsiveness.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 8 is a diagram outlining an orientation calculation process in an embodiment.

DESCRIPTION OF THE PREFERRED EMBODIMENTS

Entire Structure of Game System

Figure 1:
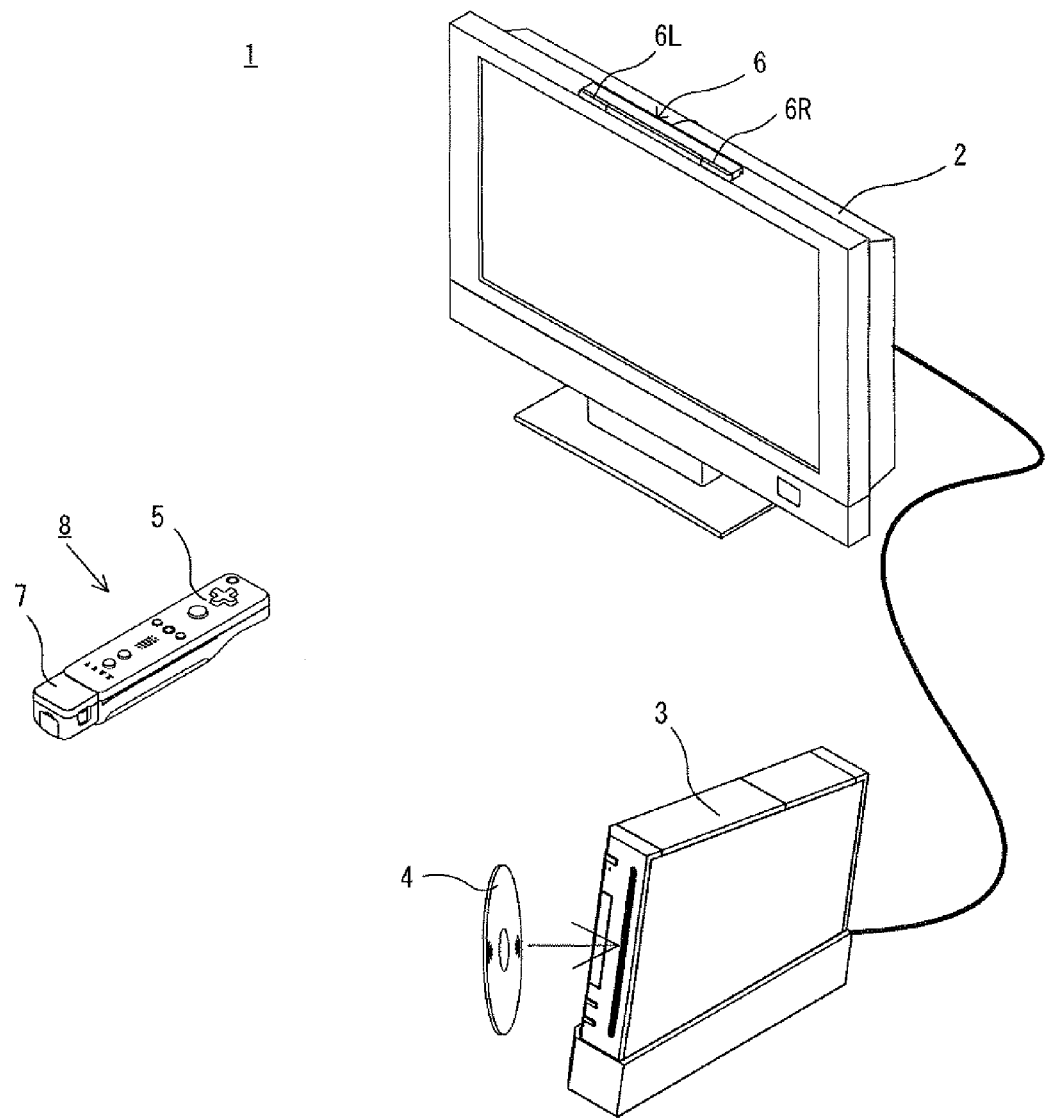
FIG. 1 is an external view of a game system.

With reference to FIG. 1, a game system 1 including a game apparatus typifying an orientation calculation apparatus according to an embodiment will be described. FIG. 1 is an external view of the game system 1. In the following description, a stationary game apparatus is taken as an example for describing a game apparatus and a game program of the present embodiment. As shown in FIG. 1, the game system 1 includes a television receiver (hereinafter, simply referred to as a "television") 2, a game apparatus 3, an optical disc 4, an input device 8, and a marker section 6. In this system, the game apparatus 3 performs a game process based on a game operation using the input device 8.

In the game apparatus 3, the optical disc 4 typifying an information storage medium used for the game apparatus 3 in a replaceable manner is detachably inserted. A game program executed by the game apparatus 3 is stored in the optical disc 4. The game apparatus 3 has, on the front surface thereof, an insertion opening for the optical disc 4. The game apparatus 3 reads and executes the game program stored in the optical disc 4 which is inserted through the insertion opening, so as to perform the game process.

The game apparatus 3 is connected to the television 2, which is an exemplary display device, through a connecting cord. A game image obtained as a result of the game process performed by the game apparatus 3 is displayed on the television 2. Further, the marker section 6 is provided on the periphery (in FIG. 1, on a portion above a screen) of a screen of the television 2. The marker section 6 includes two markers 6R and 6L on both ends thereof. Specifically, the marker 6R (as well as the marker 6L) includes one or more infrared LEDs, and emits an infrared light forward from the television 2. The marker section 6 is connected to the game apparatus 3, and the game apparatus 3 is able to control each infrared LED of the marker section 6 so as to light up each infrared LED.

The input device 8 provides the game apparatus 3 with operation data representing the content of an operation performed on the input device 8 itself. In the present embodiment, the input device 8 includes a controller 5 and a gyroscope unit 7. As described in detail below, the input device 8 is structured such that the gyroscope unit 7 is detachably connected to the controller 5. Radio communication is made between the controller 5 and the game apparatus 3. In the present embodiment, the radio communication between the controller 5 and the game apparatus 3 is made using, for example, the Bluetooth (Registered Trademark) technology.

In another embodiment, the connection between the controller 5 and the game apparatus 3 may be a wired connection.

[Internal Structure of Game Apparatus 3]

Figure 2:
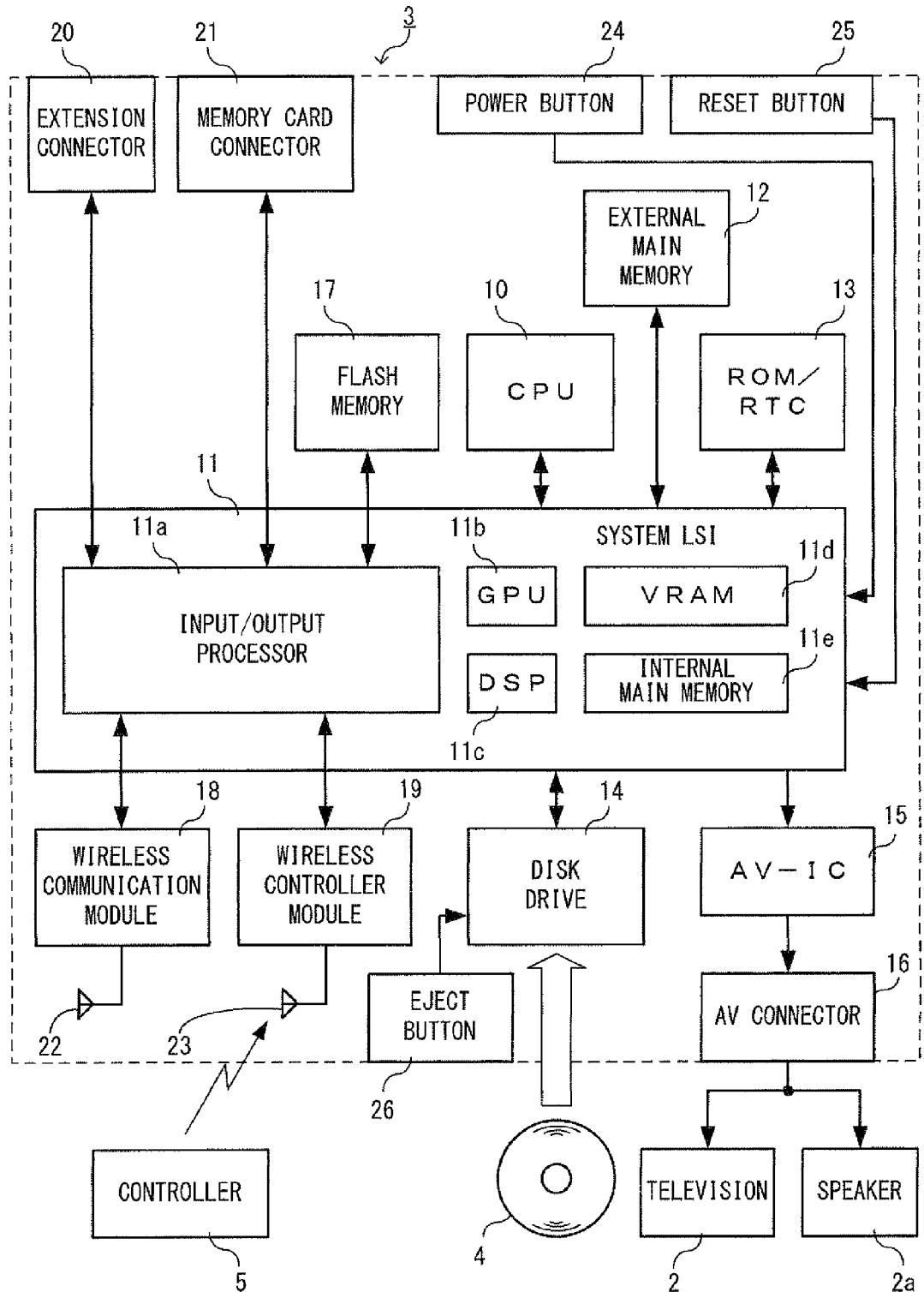
FIG. 2 is a functional block diagram of a game apparatus.

Next, an internal structure of the game apparatus 3 will be described with reference to FIG. 2. FIG. 2 is a block diagram illustrating a structure of the game apparatus 3. The game apparatus 3 includes a CPU 10, a system LSI 11, an external main memory 12, a ROM/RTC 13, a disk drive 14, an AV-IC 15, and the like.

The CPU 10, functioning as a game processor, performs game processes by executing the game program stored in the optical disc 4. The CPU 10 is connected to the system LSI 11. To the system LSI 11, the external main memory 12, the ROM/RTC 13, the disk drive 14, and the AV-IC 15 as well as the CPU 10 are connected. The system LSI 11 performs processes for controlling data transmission between the respective components connected thereto, generating an image to be displayed, acquiring data from an external device, and the like. The internal structure of the system LSI will be described below. The external main memory 12 of a volatile type stores a program such as a game program read from the optical disc 4 and a game program read from a flash memory 17, and various data, and the external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disk drive 14 reads program data, texture data, and the like from the optical disk 4, and writes the read data into an internal main memory 11e to be described below or the external main memory 12.

Further, the system LSI 11 includes an input/output processor (I/O processor) 11a, a GPU (Graphics Processor Unit) 11b, a DSP (Digital Signal Processor) 11c, a VRAM 11d, and the internal main memory 11e. These components 11a, 11b, 11c, 11d, and 11e are connected with each other through an internal bus, which is not shown.

The GPU 11b, acting as a part of rendering means, generates an image in accordance with a graphics command (rendering command) from the CPU 10. The VRAM 11d stores data (data such as polygon data and texture data) necessary for the GPU 11b to execute the graphics command. When an image is generated, the GPU 11b generates image data using data stored in the VRAM 11d.

The DSP 11c, functioning as an audio processor, generates audio data using sound data and sound waveform (tone quality) data stored in the internal main memory 11e or the external main memory 12.

The image data and the audio data generated as described above are read by the AV-IC 15. The AV-IC 15 outputs the read image data to the television 2 through an AV connector 16, and outputs the read audio data to a speaker 2a incorporated in the television 2. Thus, an image is displayed on the television 2, and a sound is outputted from the speaker 2a.

The input/output processor 11a performs data transmission to and data reception from the components connected thereto, and download of data from an external device. The input/output processor 11a is connected to the flash memory 17, a wireless communication module 18, a wireless controller module 19, an extension connector 20, and a memory card connector 21. The wireless communication module 18 is connected to an antenna 22, and the wireless controller module 19 is connected to an antenna 23.

The input/output processor 11a is connected to a network via the wireless communication module 18 and the antenna 22, so as to communicate with another game apparatus and various servers connected to the network. The input/output processor 11a regularly accesses the flash memory 17, and detects the presence or absence of any data which needs to be transmitted to the network, and when detected, transmits the data to the network through the wireless communication module 18 and the antenna 22. Further, the input/output processor 11a receives data transmitted from another game apparatus, and/or downloads data from a download server, through the network, the antenna 22, and the wireless communication module 18, and the received data and/or the downloaded data are stored to the flash memory 17. The CPU 10 executes a game program so as to read data stored in the flash memory 17 and use the data on the game program. The flash memory 17 may store saved data (game result data or intermediate-stage data) of a game played using the game apparatus 3 in addition to data transmitted from the game apparatus 3 to another game apparatus or the various servers, and data received by the game apparatus 3 from another game apparatus or the various servers.

The input/output processor 11a receives operation data transmitted from the controller 5 through the antenna 23 and the wireless controller module 19, and (temporarily) stores the received operation data to a buffer area of the internal main memory 11e or the external main memory 12.

Further, the input/output processor 11a is connected to the extension connector 20 and the memory card connector 21. The extension connector 20 is a connector for an interface, such as USB or SCSI, and allows communication with the network by connecting thereto a medium such as an external storage medium, connecting thereto another peripheral device such as a controller, and/or connecting thereto a wired communication connector, without using the wireless communication module 18. The memory card connector 21 is a connector for connecting thereto an external storage medium such as a memory card. For example, the input/output processor 11a accesses an external storage medium through the extension connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the respective components of the game apparatus 3 through an AC adaptor not shown. When the reset button 25 is pressed, the system LSI 11 reboots a boot program of the game apparatus 3. The eject button 26 is connected to the disk drive 14. When the eject button 26 is pressed, the optical disc 4 is ejected from the disk drive 14.

[Structure of Input Device 8]

Figure 3:
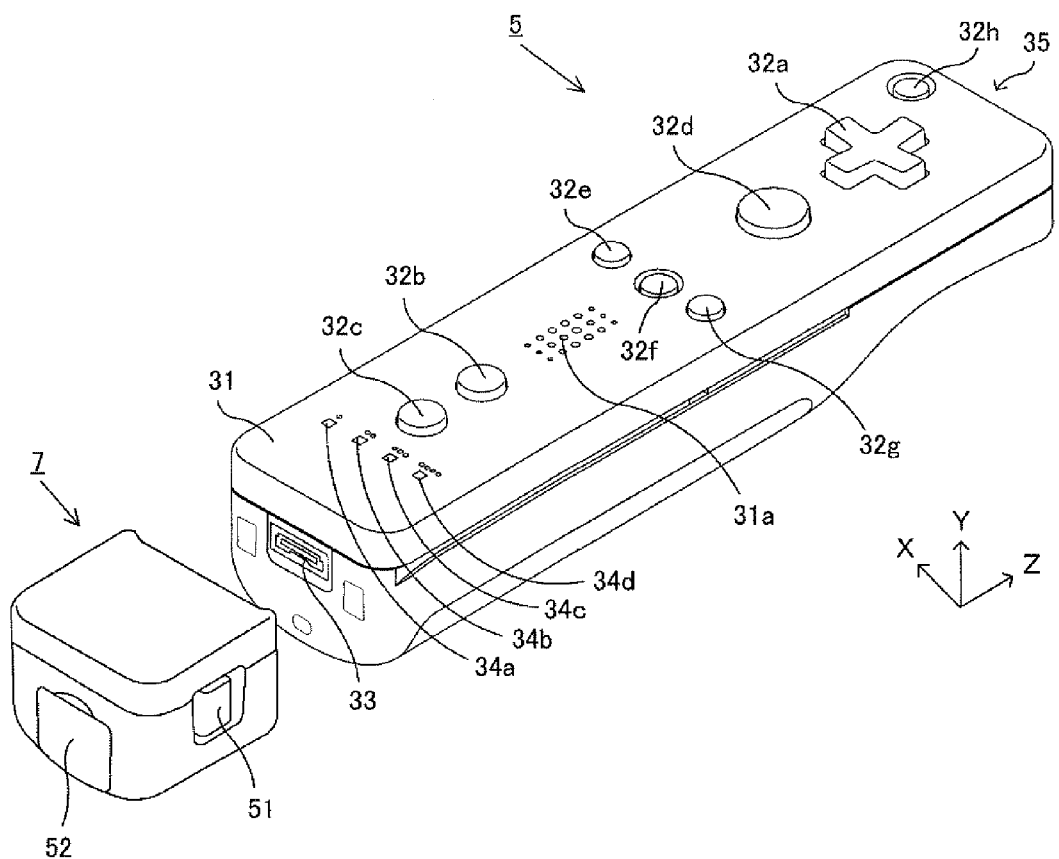
FIG. 3 is a perspective view illustrating an external structure of an input device.
Figure 4:
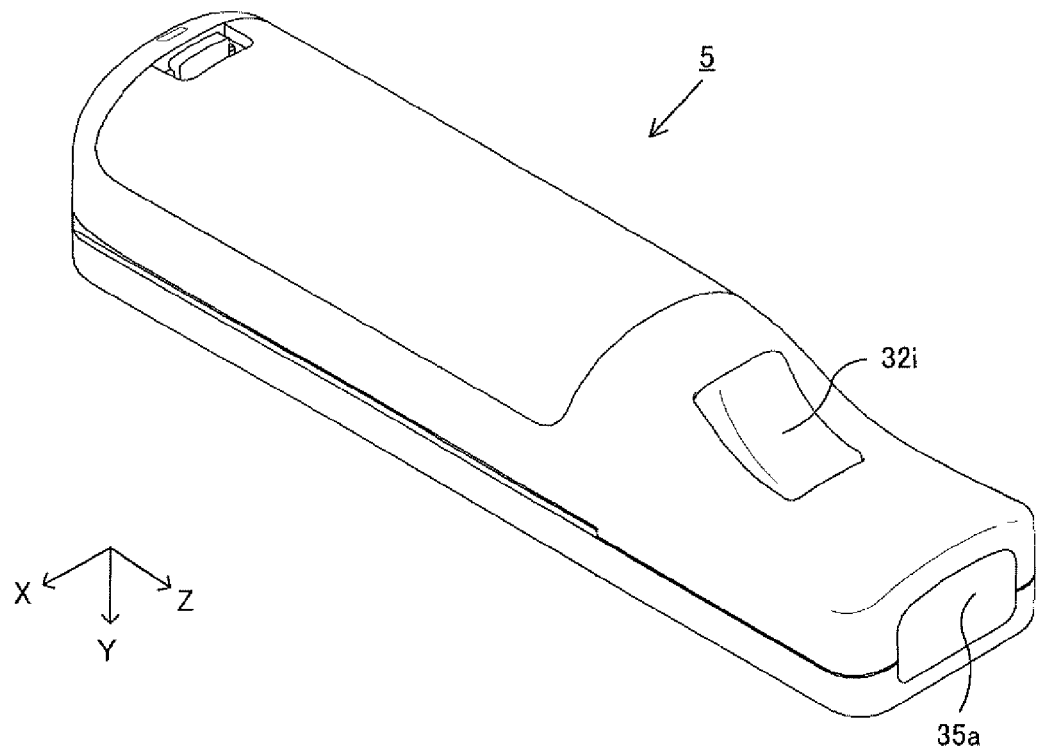
FIG. 4 is a perspective view illustrating an external structure of a controller.

Next, with reference to FIGS. 3 to 6, the input device 8 will be described. FIG. 3 is a perspective view illustrating an external structure of the input device 8. FIG. 4 is a perspective view illustrating an external structure of the controller 5. The perspective view of FIG. 3 shows the controller 5 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the orientation thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the game program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 7 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the plurality of LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 6R and 6L.

On the top surface of the housing 31, sound holes 31a for externally outputting a sound from a speaker 49 (shown in FIG. 5) incorporated in the controller 5 is provided between the first button 32b and the home button 32f.

Figure 5:
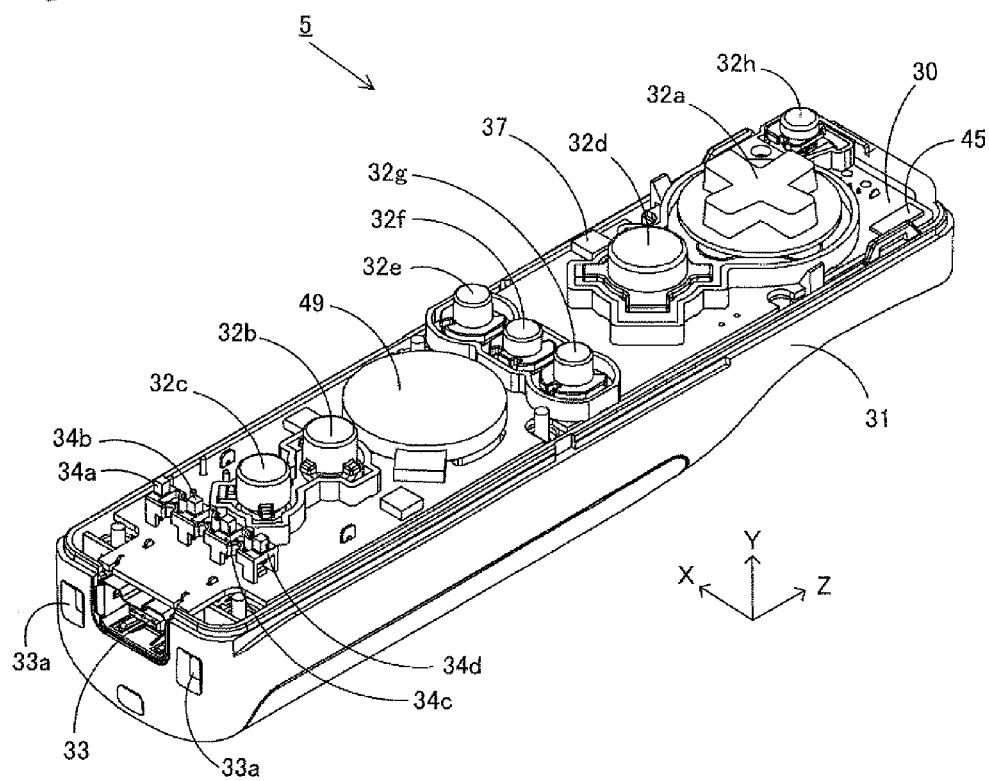
FIG. 5 is a diagram illustrating an internal structure of the controller.
Figure 6:
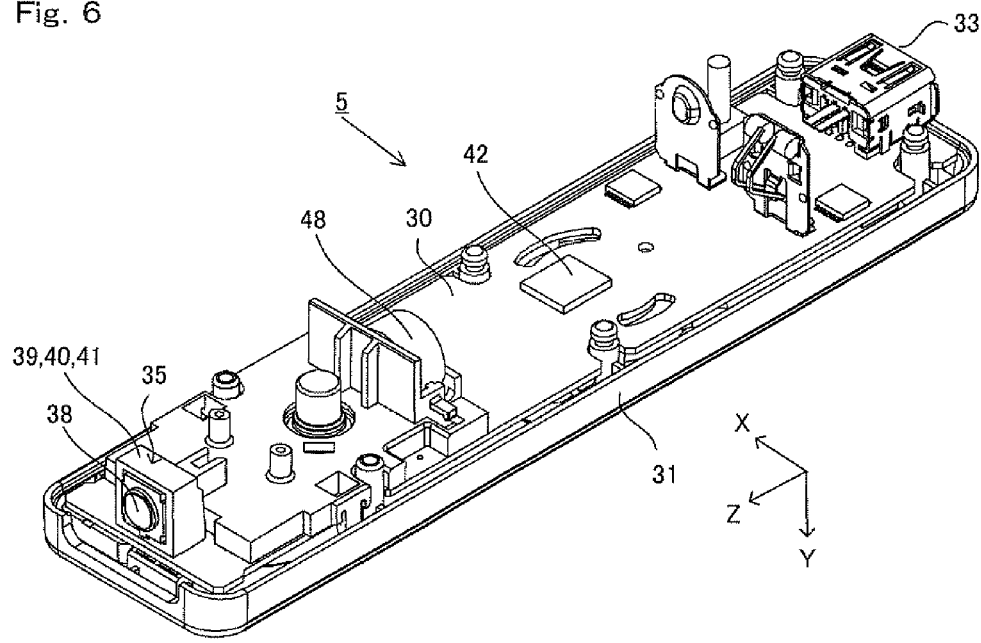
FIG. 6 is another diagram illustrating an internal structure of the controller.

Next, with reference to FIGS. 5 and 6, an internal structure of the controller 5 will be described. FIG. 5 and FIG. 6 are diagrams illustrating the internal structure of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated around the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 7 includes gyroscopes (gyroscopes 55 and 56 shown in FIG. 7) for detecting angular rates around three axes, respectively. The gyroscope unit 7 is detachably attached to the connector 33 of the controller 5. The gyroscope unit 7 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 7 is attached to the controller 5, the plug 53 is connected to the connector 33, and the hooks engage with the fastening holes 33a, respectively, of the controller 5. Therefore, the controller 5 and the gyroscope unit 7 are securely fixed to each other. Further, the gyroscope unit 7 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 7 can be disconnected from the controller 5.

Further, a connector having the same shape as the connector 33 is provided at the rear edge of the gyroscope unit 7. Therefore, another device which can be attached to (the connector 33 of) the controller 5 can be attached as well to the connector of the gyroscope unit 7. In FIG. 3, a cover 52 is detachably provided over the connector.

FIGS. 3 to 6 show only examples of the shape of the controller 5 and the gyroscope unit 7, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imagining information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
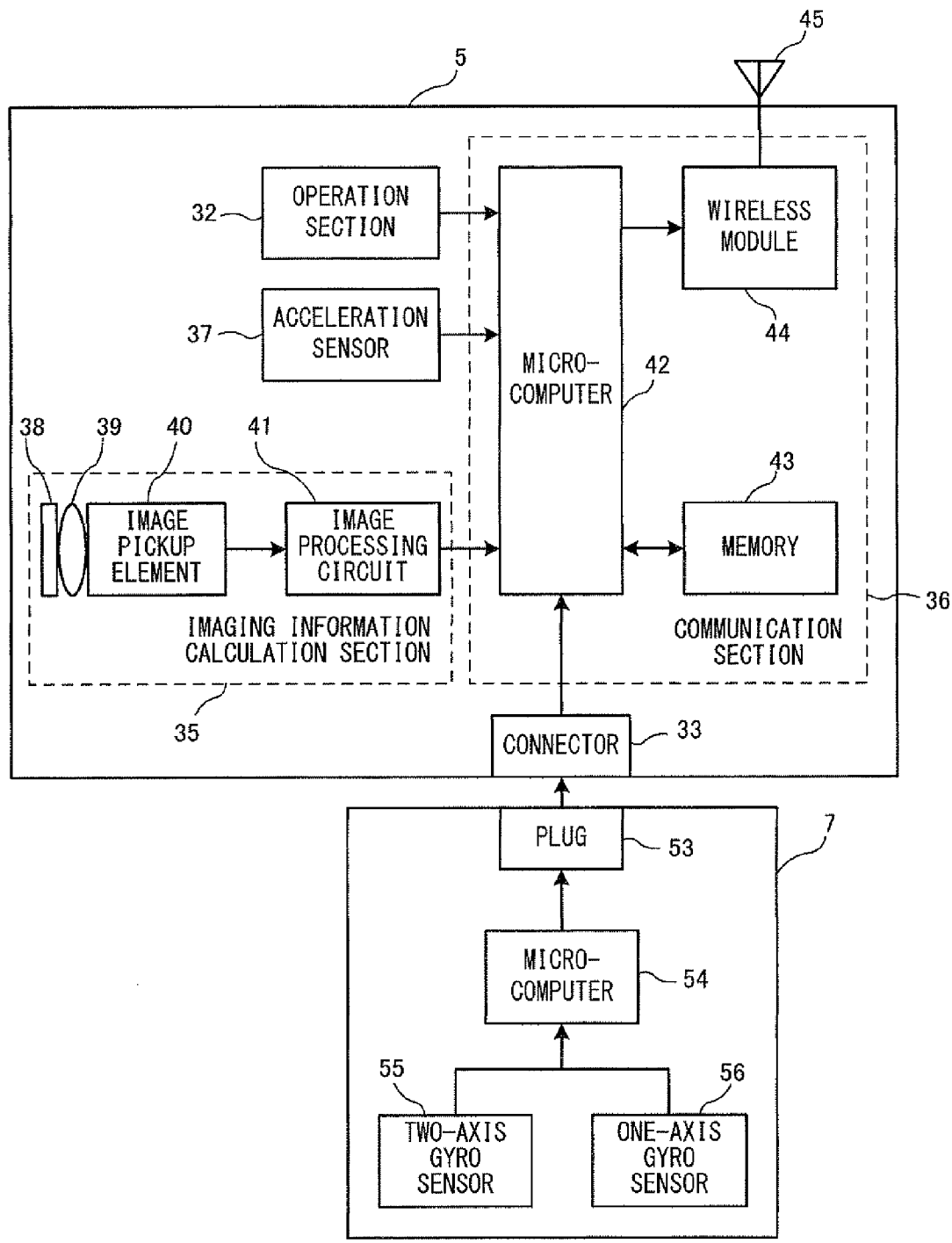
FIG. 7 is a block diagram illustrating a structure of the input device.

FIG. 7 is a block diagram illustrating a structure of the input device 8 (the controller 5 and the gyroscope unit 7). The controller 5 includes an operation section 32 (the operation buttons 32a to 32i), the connector 33, the imaging information calculation section 35, a communication section 36, and the acceleration sensor 37. The controller 5 transmits, as operation data, data representing the content of an operation performed on the controller 5 itself, to the game apparatus 3.

The operation section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The markers 6R and 6L of the marker section 6 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 6R and 6L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the marker 6R and the marker 6L). The image processing circuit 41 outputs data representing coordinate points of the calculated positions, to the microcomputer 42 of the communication section 36. The data representing the coordinate points is transmitted as operation data to the game apparatus 3 by the microcomputer 42. Hereinafter, the coordinate points are referred to as "marker coordinate points". The marker coordinate point changes depending on the orientation (angle of tilt) and/or the position of the controller 5 itself, and therefore the game apparatus 3 is allowed to calculate the orientation and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects an acceleration in the straight line direction along each axis, and an output from the acceleration sensor 37 represents a value of the linear acceleration for each of the three axes. In other words, the detected acceleration is represented as a three-dimensional vector (ax,ay,az) in an XYZ-coordinate system (controller coordinate system) defined relative to the input device 8 (controller 5). Hereinafter, a vector representing components of the acceleration values detected for the three axes, respectively, by the acceleration sensor 37 is referred to as an acceleration vector. Also, the acceleration vector may be referred to below as the "detected acceleration vector" so as to be clearly distinguishable from the motion acceleration vector to be described later.

Data (acceleration data) representing the acceleration detected by the acceleration sensor 37 is outputted to the communication section 36. The acceleration detected by the acceleration sensor 37 changes depending on the orientation (angle of tilt) and the movement of the controller 5, and therefore the game apparatus 3 is allowed to calculate the orientation and the movement of the controller 5 using the acceleration data. In the present embodiment, the game apparatus 3 determines the orientation of the controller 5 based on the acceleration data.

The acceleration data representing the acceleration detected by the acceleration sensor 37 is outputted to the communication section 36. In the present embodiment, the acceleration sensor 37 is used as a sensor for outputting data for determining the angle of tilt of the controller 5.

When a computer such as a processor (for example, the CPU 10) of the game apparatus 3 or a processor (for example, the microcomputer 42) of the controller 5 processes an acceleration signal outputted from the acceleration sensor 37, additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the orientation of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, a memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 7 is inputted to the microcomputer 42 through the connector 33. Hereinafter, a structure of the gyroscope unit 7 will be described.

The gyroscope unit 7 includes the plug 53, a microcomputer 54, the two-axis gyroscope 55, and the one-axis gyroscope 56. As described above, the gyroscope unit 7 detects angular rates around three axes (X-, Y-, and Z-axes in the present embodiment), respectively, and transmits data (angular rate data) representing the detected angular rates, to the controller 5.

The two-axis gyroscope 55 detects an angular rate (per unit time) around each of the X-axis and the Y-axis. Further, the one-axis gyroscope 56 detects an angular rate (per unit time) around the Z-axis. In the present embodiment, the directions of rotation around the X-axis, the Y-axis, and the Z-axis relative to the imaging direction (the Z-axis positive direction) of the controller 5 are referred to as a roll direction, a pitch direction, and a yaw direction, respectively. That is, the two-axis gyroscope 55 detects angular rates in the roll direction (the direction of rotation around the X-axis) and the pitch direction (the direction of rotation around the Y-axis), and the one-axis gyroscope 56 detects an angular rate in the yaw direction (the direction of rotation around the Z-axis).

In the present embodiment, the two-axis gyroscope 55 and the one-axis gyroscope 56 are used to detect the angular rates around the three axes. However, in another embodiment, the number of gyroscopes and a combination thereof to be used may be optionally selected, provided that the angular rates around the three axes can be detected.

Further, in the present embodiment, the three axes around which the gyroscopes 55 and 56 detect the angular rates are set to correspond to three axes (X-, Y-, and Z-axes), respectively, for which the acceleration sensor 37 detects accelerations, such that calculation in the orientation calculation process described below is facilitated. However, in another embodiment, the three axes around which the gyroscopes 56 and 57 detect the angular rates may not necessarily correspond to the three axes for which the acceleration sensor 37 detects accelerations.

Data representing the angular rates detected by the gyroscopes 56 and 57 are outputted to the microcomputer 54. That is, data representing the angular rates around the three axes, i.e., the X-, Y-, and Z-axes, are inputted to the microcomputer 54. The microcomputer 54 transmits the data representing the angular rates around the three axes, as angular rate data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operation section 32, the imaging information calculation section 35, and the acceleration sensor 37 to the microcomputer 42, and data transmitted from the gyroscope unit 7 to the microcomputer 42 are temporarily stored to the memory 43. The data are transmitted as the operation data to the game apparatus 3. At the time of the transmission to the wireless controller module 19 of the game apparatus 3, the microcomputer 42 outputs the operation data stored in the memory 43 to the wireless module 44. The wireless module 44 uses, for example, the Bluetooth (registered trademark) technology to modulate the operation data onto a carrier wave of a predetermined frequency, and radiates the low power radio wave signal from the antenna 45. That is, the operation data is modulated onto the low power radio wave signal by the wireless module 44 and transmitted from the controller 5. The wireless controller module 19 of the game apparatus 3 receives the low power radio wave signal. The game apparatus 3 demodulates or decodes the received low power radio wave signal to obtain the operation data. Based on the obtained operation data and the game program, the CPU 10 of the game apparatus 3 performs the game process. The wireless transmission from the communication section 36 to the wireless controller module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the wireless controller module 19 of the game apparatus 3, the respective operation data at intervals of 1/200 seconds, for example.

When the controller 5 is used, the player can perform not only a conventionally typical game operation of pressing each operation button, but also an operation of tilting the controller 5 at a desired angle of tilt. Other than these operations, the player can perform an operation of designating a desired position on the screen using the controller 5, and also can perform an operation by moving the controller 5 itself.

[Outline of Orientation Calculation Process]

Next, an orientation calculation process performed by the game apparatus 3 for calculating an orientation of the input device 8 will be outlined. In the present embodiment, the game apparatus 3 calculates an orientation of the input device 8 through the orientation calculation process, and the calculated orientation is used as a player input to execute a game process. The present embodiment assumes as an example of the games to be played with the game apparatus 3 a game in which the player uses the input device 8 to perform a game operation as if he/she were operating a driving wheel. Specifically, the player holds the input device 8 such that the Z-axis thereof is approximately horizontal, and tilts the input device 8 with the right/left side up, thereby performing an operation to change the orientation of the input device 8 (see FIG. 8). The game apparatus 3 repeatedly calculates the orientation of the input device 8, for example, to control the operation of an object placed in a virtual game space in accordance with the calculated orientation.

In the orientation calculation process of the present embodiment, the game apparatus 3 basically calculates an orientation of the input device 8 based on an output (acceleration vector) from the acceleration sensor 37. The acceleration sensor 37 detects a gravitational acceleration applied to the input device 8 (accelerations detected by the acceleration sensor 37 include a gravitational acceleration), so that the game apparatus 3 can calculate based on the detected acceleration the direction of gravity with respect to the input device 8, i.e., an inclination (orientation) of the input device 8 from the direction of gravity. Note that in the present embodiment, the orientation of the input device 8 is expressed as a vector (gravitational vector Vg shown in FIG. 8) representing the direction of gravity calculated from the acceleration.

Here, in the case where the input device 8 is at rest (including the case where the input device 8 is almost at rest and thus can be considered to be at rest), the acceleration sensor 37 only detects a gravitational acceleration, and therefore the acceleration is assumed to accurately represent the direction of gravity. Accordingly, in this case, the game apparatus 3 can accurately calculate the orientation of the input device 8 by considering the direction of acceleration as the direction of gravity. On the other hand, when the input device 8 is in motion, not only the gravitational acceleration but also any acceleration induced by the motion of the input device 8 are detected by the acceleration sensor 37. For example, the accelerations to be detected by the acceleration sensor 37 include accelerations by inertial force and centrifugal force caused due to movement of the input device 8. Therefore, when the input device 8 is in motion, the accelerations detected by the acceleration sensor 37 might not accurately represent the direction of gravity. Accordingly, when the input device 8 is in motion, if the direction of gravity is calculated using the accelerations without modification, the orientation cannot be calculated accurately. Note that when the input device 8 is in motion, a conceivably employed method is to not perform the process for calculating the direction of gravity from the accelerations. However, in this method, the game apparatus 3 cannot calculate the orientation of the input device 8 while the input device 8 is in motion, thereby failing to calculate the orientation in real-time. As a result, responsiveness for orientation calculation and operational responsiveness with the input device 8 are compromised. In this manner, the method in which the direction of gravity is calculated from the accelerations detected by the acceleration sensor 37 might have a problem when the input device 8 is in motion.

Therefore, in the orientation calculation process of the present embodiment, the game apparatus 3 performs orientation calculation based on the accelerations detected by the acceleration sensor 37, and when the orientation cannot be accurately calculated through such processing, the game apparatus 3 performs additional orientation calculation based on an angular rate detected by the gyroscopes 55 and 56. Specifically, when the acceleration detected by the acceleration sensor 37 is determined to inaccurately represent the direction of gravity, the game apparatus 3 calculates the orientation based on the angular rate detected by the gyroscopes 55 and 56. As a result, the orientation of the input device 8 can be accurately calculated with high responsiveness.

Concretely, the game apparatus 3 includes (1) reflection rate setting means, (2) first orientation calculation means, and (3) second orientation calculation means. Note that the above means (1) to (3) are implemented by a computer (CPU 10) in the game apparatus 3 executing their respective orientation calculation programs included in the game program. Specifically, the orientation calculation programs cause the computer in the game apparatus 3 to function as the means (1) to (3). These means will be described in detail below.

(1) Reflection Rate Setting Means

The reflection rate setting means sets a reflection rate s representing the degree by which the acceleration is reflected in an orientation to be calculated (the degree by which the acceleration is reflected in orientation calculation) (steps S3 and S4 to be described later). The reflection rate s is set so as to be higher the more reliably the acceleration detected by the acceleration sensor 37 represents the direction of gravity. Typically, the reflection rate s is set as a high value when the input device 8 is at or almost at rest, and as a low value when the input device 8 is in motion. That is, the reflection rate s may be set so as to be lower the more vigorously the input device is moved. In the present embodiment, the reflection rate setting means calculates the reflection rate s based on the acceleration (acceleration vector Va) detected by the acceleration sensor 37. Note that in another embodiment, the reflection rate s may be calculated based on operation data (marker coordinate data or angular rate data) transmitted from the input device 8 to the game apparatus 3 other than acceleration data.

(2) First Orientation Calculation Means

FIG. 8 is a diagram outlining the orientation calculation process in the present embodiment. When the reflection rate s is equal to or greater than a first predetermined threshold, the first orientation calculation means calculates an orientation of the input device 8 based on an acceleration (acceleration vector Va) detected by the acceleration sensor 37 (step S5 to be described later). Specifically, when the reflection rate is a relatively high value, the game apparatus 3 determines the acceleration vector Va to reliably represent the direction of gravity, and calculates an orientation (gravitational vector Vg) of the input device 8 based on the acceleration (case (A) shown in FIG. 8). Also, any method may be employed to calculate the orientation based on the acceleration. For example, as shown in FIG. 8, the first orientation calculation means may calculate an orientation of the input device 8 using without modification the direction of the acceleration vector Va as the gravitational vector Vg. As will be described in detail later, in the present embodiment, the first orientation calculation means calculates the orientation (gravitational vector Vg) of the input device 8 using the reflection rate along with the acceleration vector Va.

(3) Second Orientation Calculation Means

The second orientation calculation means calculates an orientation of the input device 8 based on an angular rate ω detected by the gyroscopes 55 and 56 when the reflection rate is lower than a second predetermined threshold (step S6 to be described later). Specifically, when the reflection rate is a relatively low value, the game apparatus 3 determines the acceleration to unreliably represent the direction of gravity, and calculates an orientation (gravitational vector Vg) of the input device 8 using the angular rate ω in place of the acceleration (case (B) shown in FIG. 8). Any method may be employed to calculate the orientation based on the angular rate ω. In the present embodiment, the second orientation calculation means calculates a new orientation by successively updating the current orientation based on the angular rate ω. Concretely, the orientation is calculated as a gravitational vector Vg obtained by rotating a gravitational vector Vg0, which corresponds to the previous orientation, in a direction opposite to the angular rate ω, as shown in FIG. 8.

As described above, in the present embodiment, the orientation of the input device 8 is calculated based on the acceleration when the reflection rate s is relatively high ((A) shown in FIG. 8) and based on the angular rate when the reflection rate s is relatively low ((B) shown in FIG. 8). In this manner, in the present embodiment, whether or not to use the acceleration detected by the acceleration sensor 37 is determined in accordance with whether or not the acceleration reliably represents the direction of gravity. Accordingly, it is possible to prevent the orientation from being calculated based on an unreliable acceleration (by which the direction of gravity is inaccurately represented), making it possible to accurately calculate the orientation. In addition, when the acceleration is unreliable, the orientation is calculated based on the angular rate, and therefore the game apparatus 3 can calculate the orientation even when the acceleration is unreliable. Specifically, it is possible to prevent deterioration in responsiveness due to the orientation not being calculated while the acceleration is unreliable, making it possible to calculate the orientation of the input device 8 with high responsiveness.

Note that in practice, when the input device 8 is used for operation, the input device 8 experiences a transitional state between states of rest and motion. The transitional state is a state in which the reflection rate s is an approximately midpoint value (concretely, a value between the first and second thresholds). In the present embodiment, to address the transitional state, the game apparatus 3 further includes third orientation calculation means. When the reflection rate s is less than the first threshold and equal to or greater than the second threshold, the third orientation calculation means calculates an orientation of the input device 8 so as to fall between orientations calculated by the first and second orientation calculation means (step S7 to be described later). Accordingly, in this case, the gravitational vector Vg representing the orientation is calculated so as to fall between gravitational vectors Vg1 and Vg2, which are respectively calculated based on the acceleration and the angular rate (see (C) shown in FIG. 8).

Here, when the orientation calculation method is suddenly changed from the calculation by the first orientation calculation means to the calculation by the second orientation calculation means during a transition between states where the reflection rate s is relatively high and where the reflection rate s is relatively low, there is a possibility that the orientation to be calculated might change suddenly. When the orientation changes suddenly, the result of a game process being performed based on the orientation (e.g., the orientation and operation of an object in a virtual game space) changes suddenly as well, so that the player might feel unnatural about input operations. On the other hand, by further providing the third orientation calculation means, it becomes possible to prevent the orientation from changing suddenly due to sudden switching of the orientation calculation method. Accordingly, it is possible to prevent the player from feeling unnatural about input operations, and improve operability of the input device 8. Note that in another embodiment, the game apparatus 3 may not necessarily include the third orientation calculation means, as in a first variant to be described later.

[Details of Game Process]

Figure 9:
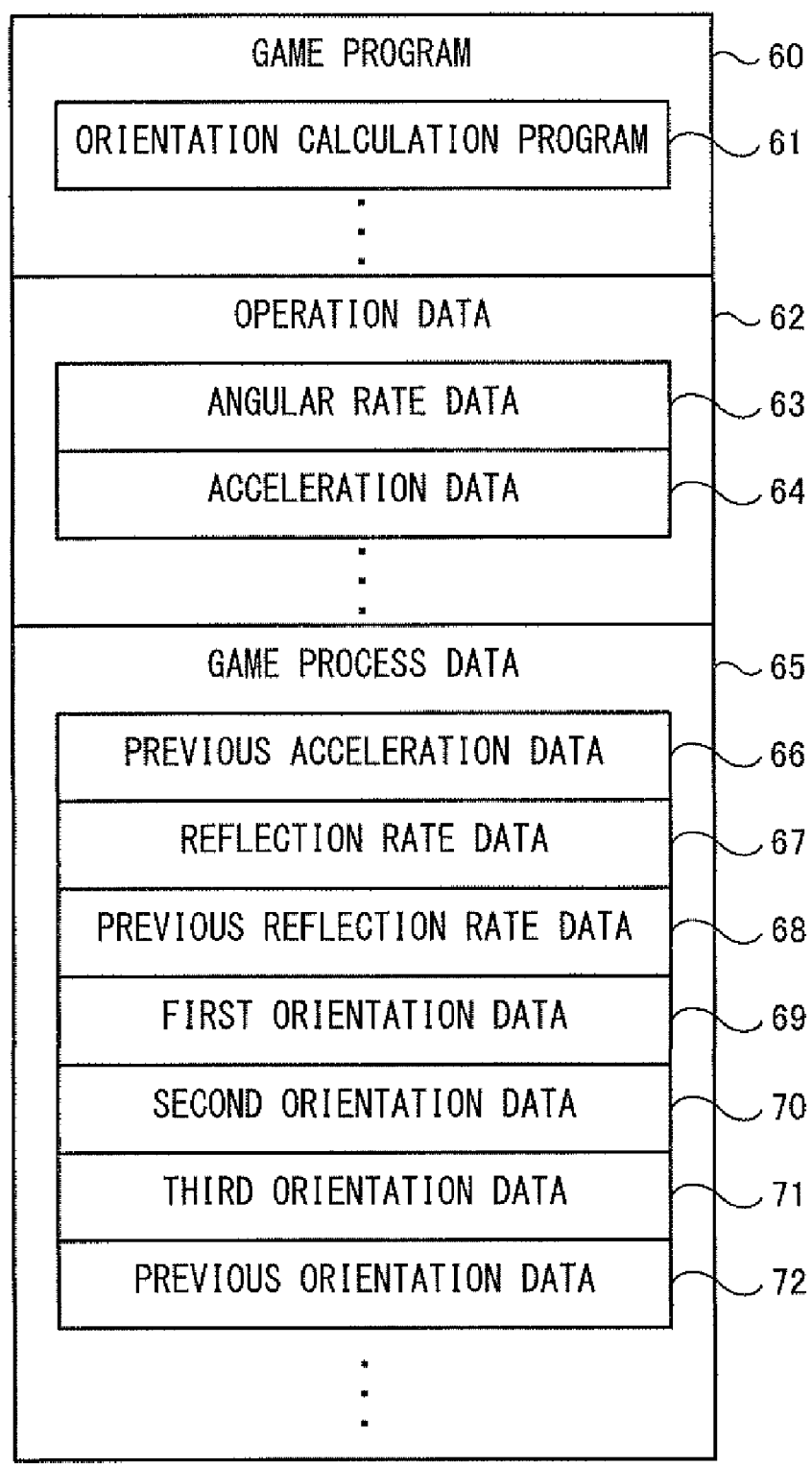
FIG. 9 is a diagram illustrating main data to be stored in a main memory of the game apparatus.

Next, the game process performed by the game apparatus 3 will be described in detail with reference to FIGS. 9 and 10. Firstly, main data used in the game process will be described with reference to FIG. 9. FIG. 9 is a diagram illustrating main data to be stored in the main memory (the external main memory 12 or the internal main memory 11*e*) of the game apparatus 3. As shown in FIG. 9, a game program 60, operation data 62, and game process data 65 are stored in the main memory of the game apparatus 3. In addition to the data shown in FIG. 9, data necessary for the game process, such as image data of various objects appearing in the game and data indicating various parameters of the objects, are stored in the main memory.

Part or all of the game program 60 is read from the optical disc 4 and stored to the main memory at an appropriate time after the game apparatus 3 is powered on. The game program 60 includes an orientation calculation program 61. The orientation calculation program 61 is a program for performing the orientation calculation process (steps S3 to S7 to be described later) for calculating an orientation of the input device 8.

The operation data 62 is operation data transmitted from the controller 5 to the game apparatus 3. As described above, the operation data is transmitted from the controller 5 to the game apparatus 3 at intervals of 1/200 seconds, and the operation data 62 stored in the main memory is updated at the same intervals.

The operation data 62 includes angular rate data 63 and acceleration data 64. The angular rate data 63 is data representing angular rates ω detected by the gyroscopes 55 and 56 of the gyroscope unit 7. Here, the angular rate data 63 represents the angular rates ω around three axes of the XYZ-coordinate system shown in FIG. 3. Note that when the controller 5 does not have the gyroscope unit 7 attached thereto, the angular rate data 63 indicates that the gyroscope unit 7 is not attached.

The acceleration data 64 is data representing an acceleration (acceleration vector) detected by the acceleration sensor 37. Here, the acceleration data 64 represents a three-dimensional acceleration vector Va whose components are accelerations associated with the directions of three axes, that is, the X-axis, the Y-axis, and the Z-axis shown in FIG. 3. Further, in the present embodiment, a magnitude of the acceleration vector Va which is detected by the acceleration sensor 37 when the input device 8 is in static state is "1". That is, the magnitude of the gravitational acceleration detected by the acceleration sensor 37 is "1".

Note that in the present embodiment, the operation data 62 includes marker coordinate data and operation button data, in addition to the angular rate data 63 and the acceleration data 64. The marker coordinate data indicates a coordinate point calculated by the image processing circuit 41 of the imaging information calculation section 35, i.e., the data indicates the aforementioned marker coordinate point. The marker coordinate point is expressed by a two-dimensional coordinate system for representing, in the plane, a position corresponding to a pickup image. Also, the operation button data is data representing an input state of each of the operation buttons 32a to 32i.

Figure 10:
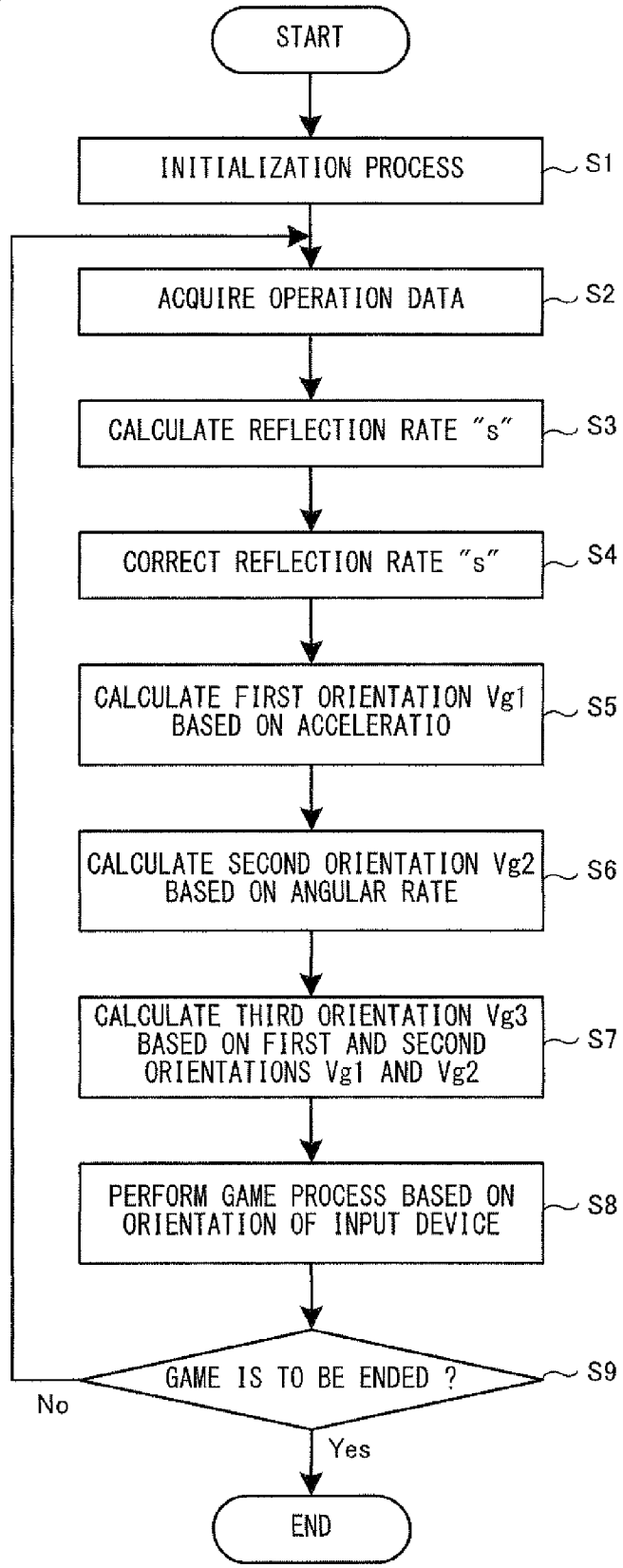
FIG. 10 is a main flow chart showing a flow of a process performed by the game apparatus.

The game process data 65 is data used for a game process to be described later (FIG. 10). The game process data 65 includes previous acceleration data 66, reflection rate data 67, previous reflection rate data 68, first orientation data 69, second orientation data 70, third orientation data 71, and previous orientation data 72. Note that the game process data 65 includes various data (e.g., data indicating any game parameter) used for the game process, in addition to the data shown in FIG. 9.

The previous acceleration data 66 is acceleration data included in previously acquired operation data 62. Specifically, the CPU 10 repeatedly acquires operation data 62 from the input device 8, and when new operation data 62 is acquired, data stored in the main memory as acceleration data 64 at that time is stored to the main memory as previous acceleration data 66. An acceleration vector (previous acceleration vector) Va0 represented by the previous acceleration data 66 is used for calculating the reflection rate s and the first gravitational vector Vg1.

The reflection rate data 67 is data indicating the reflection rate s. In the present embodiment, the reflection rate s is calculated based on the acceleration vector Va detected by the acceleration sensor 37 and the previous acceleration vector Va0. The reflection rate s is a variable indicating the degree of reliability of the acceleration vector Va representing the direction of gravity. As will be described in detail later, the reflection rate s is in the range of $0 \leq s \leq 1$, and the higher the value, the more reliable the acceleration vector Va (the more reliably the acceleration vector Va represents the direction of gravity).

The previous reflection rate data 68 is data indicating a previously calculated reflection rate. Specifically, the CPU 10 repeatedly calculates the reflection rate s, and when a new reflection rate s is calculated, data stored in the main memory as reflection rate data 67 at that time is stored to the main memory as previous reflection rate data 68. As will be described in detail later, a previous reflection rate s0 is used in a process for correcting the reflection rate s (step S4).

The first orientation data 69 is data representing an orientation (first orientation) of the input device 8 calculated based on the acceleration vector Va. In the present embodiment, the orientation of the input device 8 is represented by a gravitational vector indicating the direction of gravity with respect to the input device 8. Accordingly, the first orientation data 69 represents a first gravitational vector Vg1 calculated based on the acceleration vector Va. Note that in another embodiment, the orientation of the input device 8 may be represented by, for example, a vector representing a predetermined axis (e.g., Z-axis) of the input device 8 in a space or a 3×3 matrix having as elements three vector components representing the directions of the X-, Y-, and Z-axes of the input device 8. Also, while the present embodiment is described taking as an example a case where three-dimensional orientations of the input device 8 are calculated, in another embodiment, the game apparatus 3 may calculate two-dimensional orientations of the input device 8.

The second orientation data 70 is data representing an orientation (second orientation) of the input device 8 calculated based on the angular rate ω detected by the gyroscopes 55 and 56. In the present embodiment, as in the case of the first orientation, the second orientation is also represented by a gravitational vector indicating the direction of gravity with respect to the input device 8. Specifically, the second orientation data 70 represents a second gravitational vector Vg2 calculated based on the angular rate ω.

The third orientation data 71 is data representing an orientation (third orientation) of the input device 8 calculated based on the first and second orientations. In the present embodiment, as in the cases of the first and second orientations, the third orientation is also represented by a gravitational vector indicating the direction of gravity with respect to the input device 8. Specifically, the third orientation data 71 represents a third gravitational vector Vg3 calculated based on the first and second gravitational vectors Vg1 and Vg2. Note that the third gravitational vector Vg3 is calculated so as to fall between the first and second gravitational vectors Vg1 and Vg2. In the present embodiment, the third gravitational vector Vg3 is used as a final orientation of the input device 8.

The previous orientation data 72 is data representing a previously calculated orientation (third orientation) of the input device 8. Specifically, the CPU 10 repeatedly calculates the third orientation, and when a new third orientation is calculated, data stored in the main memory as third orientation data 71 at that time is stored to the main memory as previous orientation data 72. Hereinafter, a gravitational vector representing the previous third orientation indicated by the previous orientation data 72 is referred to as a "previous gravitational vector Vg0". The previous gravitational vector Vg0 is used for calculating the current second orientation (i.e., the second gravitational vector Vg2).

Next, the process performed by the game apparatus 3 will be described in detail with reference to FIG. 10. FIG. 10 is a main flow chart showing a flow of the process performed by the game apparatus 3. When the game apparatus 3 is powered on, the CPU 10 of the game apparatus 3 executes a boot program stored in a boot ROM not shown, so as to initialize each unit, including the main memory. The game program stored in the optical disc 4 is loaded to the main memory, and the CPU 10 starts executing the game program. The flow chart of FIG. 10 illustrates a process performed when the processes described above are completed.

Firstly, in step S1, the CPU 10 executes an initialization process for the game. In the initialization process, values of various parameters used for the game process are initialized, a virtual game space is constructed, and a player object and other objects are arranged at initial positions in the game space. Also, an initial value is set for any necessary data included in the game process data 65. For example, data indicating "0" is stored to the main memory as previous acceleration data 66. In addition, data indicating "1" is stored to the main memory as previous reflection rate data 68. After step S1, a process loop of steps S2 to S9 is repeatedly performed while the game is being executed. Note that the process loop is executed once per frame period (e.g., 1/60 seconds).

In step S2, the CPU 10 acquires operation data. Specifically, operation data transmitted from the controller 5 is received via the wireless controller module 19. Then, angular rate data, acceleration data, etc., included in the received operation data are stored to the main memory. Following step S2, the process of step S3 is performed.

In step S3, the CPU 10 calculates a reflection rate s. The reflection rate s is calculated based on an acceleration vector Va detected by the acceleration sensor 37 and a previous acceleration vector Va0. The CPU 10 reads the acceleration data 64 and the previous acceleration data 66 from the main memory, and calculates the reflection rate s based on the acceleration vector Va and the previous acceleration vector Va0 in accordance with equation (1) as follows.

$$s = 1 - (|Va - Va0| - Dmin)/(Dmax - Dmin) \quad (1)$$

In equation (1), constants Dmin and Dmax are predetermined. As shown in equation (1), the reflection rate s is calculated based on the difference between the acceleration vector Va and the previous acceleration vector Va0, i.e., the amount of change (per unit time) for an acceleration. Concretely, the reflection rate s is calculated so as to be lower the higher the amount of change for the acceleration. This is because the higher the amount of change for the acceleration, the higher the possibility that the input device 8 is in motion, and the acceleration vector is estimated to be unreliable (the acceleration vector is estimated to inaccurately represent the direction of gravity). Note that constant Dmin represents the upper limit of the amount of change corresponding to the reflection rate s being "1", and constant Dmax represents the lower limit of the amount of change corresponding to the reflection rate s being "0". Specifically, the reflection rate s varies from 0 to 1 depending on the constant. Accordingly, the reflection rate s is "1" when the amount of change is equal to or less than constant Dmin, "0" when the amount of change is equal to or greater than constant Dmax, and in the range of 0<d<1 when the amount of change falls between constants Dmin and Dmax. Therefore, the game creator suitably adjusts constants Dmin and Dmax, thereby suitably setting the reflection rate s in accordance with characteristics of the acceleration sensor 37, the content of game operations and processes, and so on. Data indicating the reflection rate s calculated by the process of step S3 is stored to the main memory as reflection rate data 67. Following step S3, the process of step S4 is performed.

Note that in step S3, the CPU 10 calculates the reflection rate s based on the amount of change (per unit time) for the acceleration in order to determine the degree of reliability of the acceleration vector (representing the direction of gravity). Here, the reflection rate s may be calculated by another method for determining the degree of reliability (dependability) of the acceleration vector Va. For example, in another embodiment, the reflection rate s may be calculated based on the difference in magnitude between the acceleration vector Va and the gravitational acceleration (=1). Concretely, the CPU 10 may calculate the reflection rate s in accordance with equation (1) in which "|Va−Va0|" is changed to "|Va−G| (where G is a magnitude of the gravitational acceleration)".

Also, the reflection rate s may be calculated based not only on the acceleration data 64, which is an output from the acceleration sensor 37, but also on other data included in the operation data. For example, in another embodiment, the reflection rate s may be calculated based on an angular rate ω indicated by the angular rate data 63. Specifically, when the angular rate ω is high, the input device 8 can be estimated to be in vigorous motion, so that the acceleration vector Va can be estimated to be unreliable. Accordingly, the CPU 10 may calculate the reflection rate s so as to be lower the higher the angular rate ω. Also, in another embodiment, the reflection rate s may be calculated based on the amount of change (displacement) for a marker coordinate point indicated by the marker coordinate data. Specifically, when the amount of change for the marker coordinate point is high, the input device 8 can be estimated to be in vigorous motion, so that the acceleration vector Va can be estimated to be unreliable. Accordingly, the CPU 10 may calculate the reflection rate s so as to be lower the higher the amount of change for the marker coordinate point. In addition, the reflection rate s may be set based on whether or not the orientation can be calculated based on the angular rate ω (see a third variant to be described later).

In step S4, the CPU 10 corrects the reflection rate s. The reflection rate s is corrected based on the current reflection rate s calculated in step S3 and a previous reflection rate s0. Specifically, the CPU 10 reads the reflection rate data 67 and the previous reflection rate data 68 from the main memory. Then, a post-correction reflection rate s' is calculated based on a pre-correction reflection rate s indicated by the reflection rate data 67 and a previous reflection rate s0 indicated by the previous reflection rate data 68 in accordance with equation (2) as follows.

$$s' = s0 \cdot S1 + (1 - S1) \cdot s, \text{ where } s0 < s$$

$$s' = s, \text{ where } s0 \geq s \quad (2)$$

In equation (2), constant S1 is predetermined in the range of 0<S1<1. As shown in equation (2), when the reflection rate s calculated in the current process loop (S2 to S9) is higher than the previous reflection rate s0, the current reflection rate s is corrected so as to fall between that reflection rate s and the previous reflection rate s0. On the other hand, when the reflection rate s calculated in the current process loop is equal to or less than the previous reflection rate s0, the current reflection rate s is not corrected. That is, by equation (2), the reflection rate s is set so as not to change suddenly when it rises. Data indicating the reflection rate s corrected by the process of step S4 is stored to the main memory as an update to the reflection rate data 67. Following step S4, the process of step S5 is performed.

The process of step S4 takes into account the case where the reflection rate s temporarily rises with the input device 8 being moved. For example, in some cases, when the input device 8 is in reciprocating motion, the amount of change for the acceleration might be low at a point of turning back during the reciprocating motion. In such a case, although it is highly unlikely that the acceleration vector Va accurately represents the direction of gravity (because the input device 8 is being moved vigorously), the reflection rate s is high, as can be seen from equation (1). When the reflection rate s is high, the orientation of the input device 8 is calculated based on the unreliable acceleration vector Va, making it difficult to accurately calculate the orientation of the input device 8. On the other hand, in the present embodiment, in the case where the reflection rate s temporarily rises, the reflection rate s is corrected by equation (2) so as to be lower. Thus, it is possible to prevent the above problem, making it possible to accurately calculate the orientation of the input device 8. Note that in the case where the reflection rate s temporarily falls, the above problem does not occur, and therefore the reflection rate s is not corrected.

Also, in another embodiment, for example, when the reflection rate s is not expected to temporarily rise as described above or when priority is placed on simplification or speeding up of the game process, the CPU 10 may not necessarily perform the process of step S4 and may use the reflection rate s calculated in step S3 without modification.

In step S5, the CPU 10 calculates a first orientation (first gravitational vector Vg1) based on an acceleration. In the present embodiment, the first gravitational vector Vg1 is calculated based on the acceleration vector Va detected by the acceleration sensor 37, the previous gravitational vector Vg0, and the reflection rate s. Concretely, the CPU 10 reads the acceleration data 64, the previous orientation data 72, and the reflection rate data 67 from the main memory. Then, the first gravitational vector Vg1 is calculated based on the acceleration vector Va, the previous gravitational vector Vg0, and the reflection rate s in accordance with equation (3) as follows.

$$Vg1 = Va \cdot s + Vg0 \cdot (1-s) \quad (3)$$

As shown in equation (3), the first gravitational vector Vg1 is calculated as a weighted average of the acceleration vector Va and the direction of gravity (previous gravitational vector Vg0) corresponding to an orientation calculated by the previous process loop. Note that the weighted average is obtained based on a weight corresponding to the reflection rate s. Specifically, when the reflection rate s is high (close to 1), the acceleration vector Va is determined to be reliable (i.e., the direction of gravity is accurately represented), and the first gravitational vector Vg1 is closer to the acceleration vector Va. On the other hand, when the reflection rate s is low (close to 0), the acceleration vector Va is determined to be unreliable (i.e., the direction of gravity is not accurately represented), and the first gravitational vector Vg1 is closer to the previous direction of gravity. In this manner, by using the reflection rate s in the process for calculating the first orientation based on the acceleration, it becomes possible to more accurately calculate the first orientation.

The first gravitational vector Vg1 calculated by equation (3) is normalized (corrected to be 1 in length), and data indicating the normalized first gravitational vector Vg1 is stored to the main memory as first orientation data 69. Note that in the present embodiment, at the point of step S5 during the first process loop after the start of the game process, the previous orientation data 72 has not yet been stored in the main memory, and therefore the CPU 10 considers the acceleration vector Va as the first gravitational vector Vg1 without modification. Following step S5, the process of step S6 is performed.

Note that any method may be employed for calculating the first orientation in step S5 so long as the first orientation is calculated using the acceleration detected by the acceleration sensor 37. For example, the CPU 10 may perform the calculation without using the reflection rate s by using the acceleration vector Va as the first gravitational vector Vg1 without modification. Also, while equation (3) is a method for calculating the first gravitational vector Vg1 by causing the previous gravitational vector Vg0 to approach the acceleration vector Va at a rate corresponding to the reflection rate s, in another embodiment, a method may be employed in which the first gravitational vector Vg1 is calculated by causing the previous gravitational vector Vg0 to approach the acceleration vector Va at a constant rate. Note that even when the reflection rate s is not used in step S5 to calculate the first gravitational vector Vg1, the reflection rate s is used in step S7 to be described later, and therefore the CPU 10 is required to perform the process of step S3 (and the process of step S4).

In step S6, the CPU 10 calculates a second orientation (second gravitational vector Vg2) based on an angular rate. Although any method can be employed for calculating the second orientation from the angular rate, in the present embodiment, the second gravitational vector Vg2 is calculated based on an angular rate ω detected by the gyroscopes 55 and 56 and the previous gravitational vector Vg0. Concretely, the CPU 10 reads the angular rate data 63 and the previous orientation data 72 from the main memory. Then, the second gravitational vector Vg2 is calculated based on the angular rate ω and the previous gravitational vector Vg0 in accordance with equation (4) below. Note that in the present embodiment, the previous orientation data 72 has not been stored in the main memory at the point of the first process loop after the start of the game process, and therefore the CPU 10 reads the first orientation data 69 instead of the previous orientation data 72, and performs the calculation using the first gravitational vector Vg1 instead of the previous gravitational vector Vg0 in accordance with equation (4) as follows.

$$Vg2 = R \cdot Vg0 \quad (4)$$

In equation (4), matrix R is a rotational matrix for rotating in a direction opposite to the angular rate ω, and is calculated from the angular rate ω. The reason why matrix R is set to be a rotational matrix for rotating in a direction opposite to the angular rate ω is that, in the present embodiment, various gravitational vectors (which are fixed relative to the space) are represented with respect to the input device 8, and when the input device 8 rotates, the gravitational vectors are required to be turned back by an angle of the rotation (i.e., they are required to be rotated in a direction opposite to the rotational direction of the input device 8). As shown in equation (4), in the present embodiment, the second orientation based on the angular rate is calculated by rotating the current orientation of the input device 8 in accordance with a detected angular rate. Data indicating the second gravitational vector Vg2 calculated by the process of step S6 is stored to the main memory as second orientation data 70. Following step S6, the process of step S7 is performed.

In step S7, the CPU 10 calculates a third orientation (third gravitational vector Vg3) based on the first orientation (first gravitational vector Vg1) and the second orientation (second gravitational vector Vg2). Concretely, the CPU 10 reads the first orientation data 69, the second orientation data 70, and the reflection rate data 67 from the main memory. Then, the third gravitational vector Vg3 is calculated based on the first gravitational vector Vg1, the second gravitational vector Vg2, and the reflection rate s in accordance with equation (5) as follows.

$$Vg3 = (1-s) \cdot Vg2 + s \cdot Vg1 \quad (5)$$

As shown in equation (5), the third gravitational vector Vg3 is calculated as a weighted average of the first gravitational vector Vg1 and the second gravitational vector Vg2. Note that the weighted average is obtained based on a weight corresponding to the reflection rate s. The third gravitational vector Vg3 calculated by equation (5) is normalized, and data indicating the normalized third gravitational vector Vg3 is stored to the main memory as third orientation data 71. Following step S7, the process of step S8 is performed.

As shown in equation (5), in the present embodiment, the first gravitational vector Vg1 based on the acceleration and the second gravitational vector Vg2 based on the angular rate apparently appear to be used consistently (every frame). However, in practice, as is apparent from equation (5), when the reflection rate s=1, the first gravitational vector Vg1 is used as the third gravitational vector Vg3 without modification ((A) shown in FIG. 8), and when the reflection rate s=0, the second gravitational vector Vg2 is used as the third gravitational vector Vg3 without modification ((B) shown in FIG. 8). Furthermore, when the reflection rate s is in the range of 0<s<1, the third gravitational vector Vg3 falls between the first gravitational vector Vg1 and the second gravitational vector Vg2 ((C) shown in FIG. 8). That is, in the present embodiment, the following are conceivable.

The CPU 10 performing step S5 corresponds to the "first orientation calculation means", and calculates the orientation of the input device 8 based on the acceleration vector Va detected by the acceleration sensor 37 when the reflection rate s is equal to or greater than a predetermined first threshold (where s=1).

The CPU 10 performing step S6 corresponds to the "second orientation calculation means", and calculates the orientation of the input device 8 based on the angular rate ω detected by the gyroscopes 55 and 56 when the reflection rate s is less than a predetermined second threshold (where s=0).

The CPU 10 performing step S7 corresponds to the "third orientation calculation means", and calculates the orientation of the input device 8 so as to fall between the orientations calculated by the first and second orientation calculation means when the reflection rate s is less than the first threshold and equal to or greater than the second threshold (where 0<s<1).

In step S8, the CPU 10 performs a game process based on the orientation (third gravitational vector Vg3) of the input device 8. The game process may be any process, e.g., a process of controlling the travel direction of a car placed in a virtual space in accordance with a steering operation with the input device 8 or a process of controlling the inclination of an object placed in a virtual space in accordance with the inclination of the input device 8. Following step S8, the process of step S9 is performed.

In step S9, the CPU 10 determines whether or not to end the game. The determination of step S9 is performed based on, for example, whether or not the game has been cleared, whether or not the game is over, or whether or not the player has given an instruction to stop the game. When the determination result of step S9 is negative, the process of step S2 is performed again. Thereafter, the process loop of steps S2 to S9 is repeated until it is determined in step S9 that the game is to be ended. On the other hand, when the determination result of step S9 is affirmative, the CPU 10 ends the game process shown in FIG. 10. This is the end of the description of the game process in the present embodiment.

As described above, in the present embodiment, the game apparatus 3 determines the degree by which the acceleration detected by the acceleration sensor 37 is reflected in the orientation of the input device 8, in accordance with the reflection rate. Then, whether to calculate the orientation based on the acceleration or the angular rate is determined in accordance with the reflection rate. As a result, it is possible to prevent the orientation from being inaccurately calculated based on an acceleration unreliably representing the direction of gravity, making it possible to accurately calculate the orientation. Also, the orientation is stopped from being calculated based on the acceleration, thereby preventing deterioration in responsiveness as to orientation calculation, so that the orientation can be calculated in real-time.

Furthermore, in the present embodiment, the orientation of the input device 8 is calculated so as to fall between the first orientation based on the acceleration and the second orientation based on the angular rate during a transitional period in which the input device 8 transitions from rest to motion or from motion to rest. Accordingly, it is possible to prevent a sudden change in orientation at the time of such a transition, making it possible to provide an input system with satisfactory operability allowing the use of the input device 8 without causing any sudden change of the game result.

[Variants]

Note that the above embodiment is merely an example, and in another embodiment, any of the configurations described in the following variants may be employed. Hereinafter, variants of the above embodiment will be described.

(First Variant)

A first variant of the present embodiment will be described below. In the above embodiment, when the reflection rate s is a moderate value, the game apparatus 3 determines a final orientation based on both the first and second orientations, which are based on the acceleration and the angular rate, respectively. Here, in another embodiment, the game apparatus 3 may use only one of the first and second orientations. The first variant will be described in detail below with reference to FIG. 11.

Figure 11:
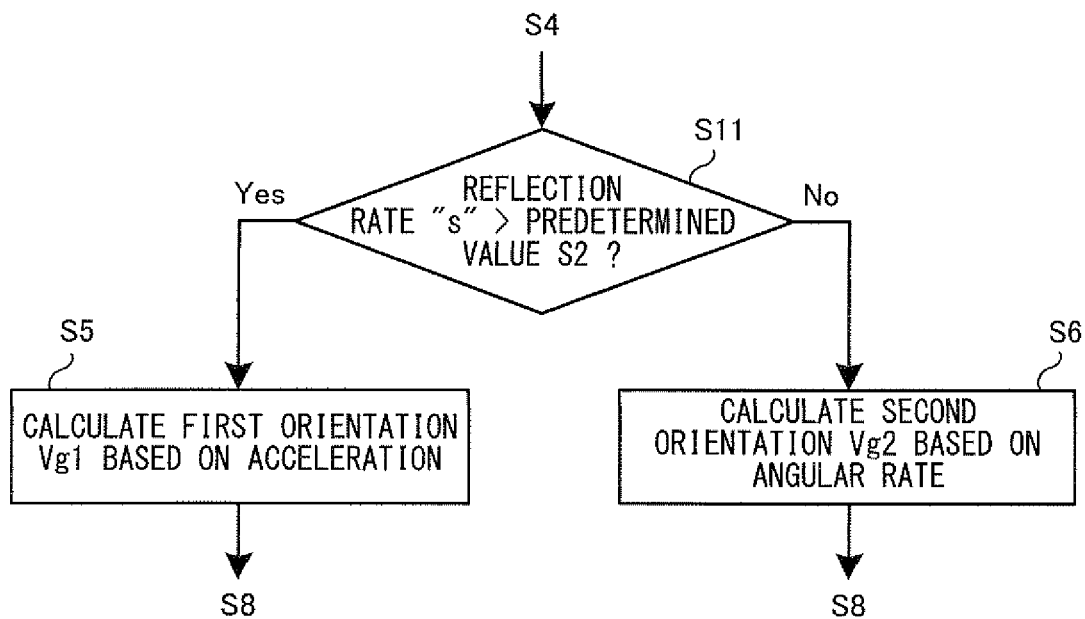
FIG. 11 is a flow chart illustrating a flow of a game process in a first variant of the embodiment.

FIG. 11 is a flow chart illustrating a flow of the game process in the first variant of the present embodiment. Note that FIG. 11 shows only the difference from the flow chart shown in FIG. 10. Also, in FIG. 11, the same process steps as in FIG. 10 are denoted by the same step numbers as in FIG. 10.

In the first variant, the process of step S11 is performed after step S4. In step S11, the CPU 10 determines whether the reflection rate s obtained by the process of step S4 is greater than a predetermined value S2. The value S2 is predetermined in the range of 0<S2<1. Specifically, the CPU 10 reads the reflection rate data 67 and data indicating the predetermined value S2 from the main memory, and compares the reflection rate s with the predetermined value S2. When the determination result of step S11 is affirmative (i.e., the reflection rate s>the predetermined value S2), the process of step S5 is performed. On the other hand, when the determination result of step S11 is negative (i.e., the reflection rate s≦the predetermined value S2), the process of step S6 is performed.

The process of step S5 is the same as in the above embodiment, and the CPU 10 calculates the first orientation (first gravitational vector Vg1) based on the acceleration vector Va. The process of step S6 is also the same as in the above embodiment, and the CPU 10 calculates the second orientation (second gravitational vector Vg2) based on the angular rate ω. In the first variant, the process of step S8 is performed after step S5 or S6. That is, in the game process of step S8, either the first orientation calculated in step S5 or the second orientation calculated in step S6 is used as the orientation of the input device 8.

As described above, in the first variant, an orientation to be used as the final orientation of the input device 8 is determined in accordance with the reflection rate s from among the first orientation based on the acceleration and the second orientation based on the angular rate. For example, when it is assumed in the above embodiment that a period in which the reflection rate s is in the range of 0<s<1 is in fact extremely short or, when priority is placed on simplification or speeding up of the game process, the first variant may be employed. Also, in the first variant, the reflection rate s may be expressed by a binary value.

(Second Variant)

A second variant of the present embodiment will be described below. In the above embodiment, the game apparatus 3 calculates the orientation of the input device 8 using the first and second orientations, which are based on the acceleration and the angular rate, respectively, during transitional periods for both cases where the reflection rate s transitions from high to low or from low to high. Here, in the second variant, the orientation is calculated based on the first and second orientations only during a transitional period in which the reflection rate s transitions from low to high. The second variant will be described in detail below with reference to FIGS. 12 and 13.

Figure 12:
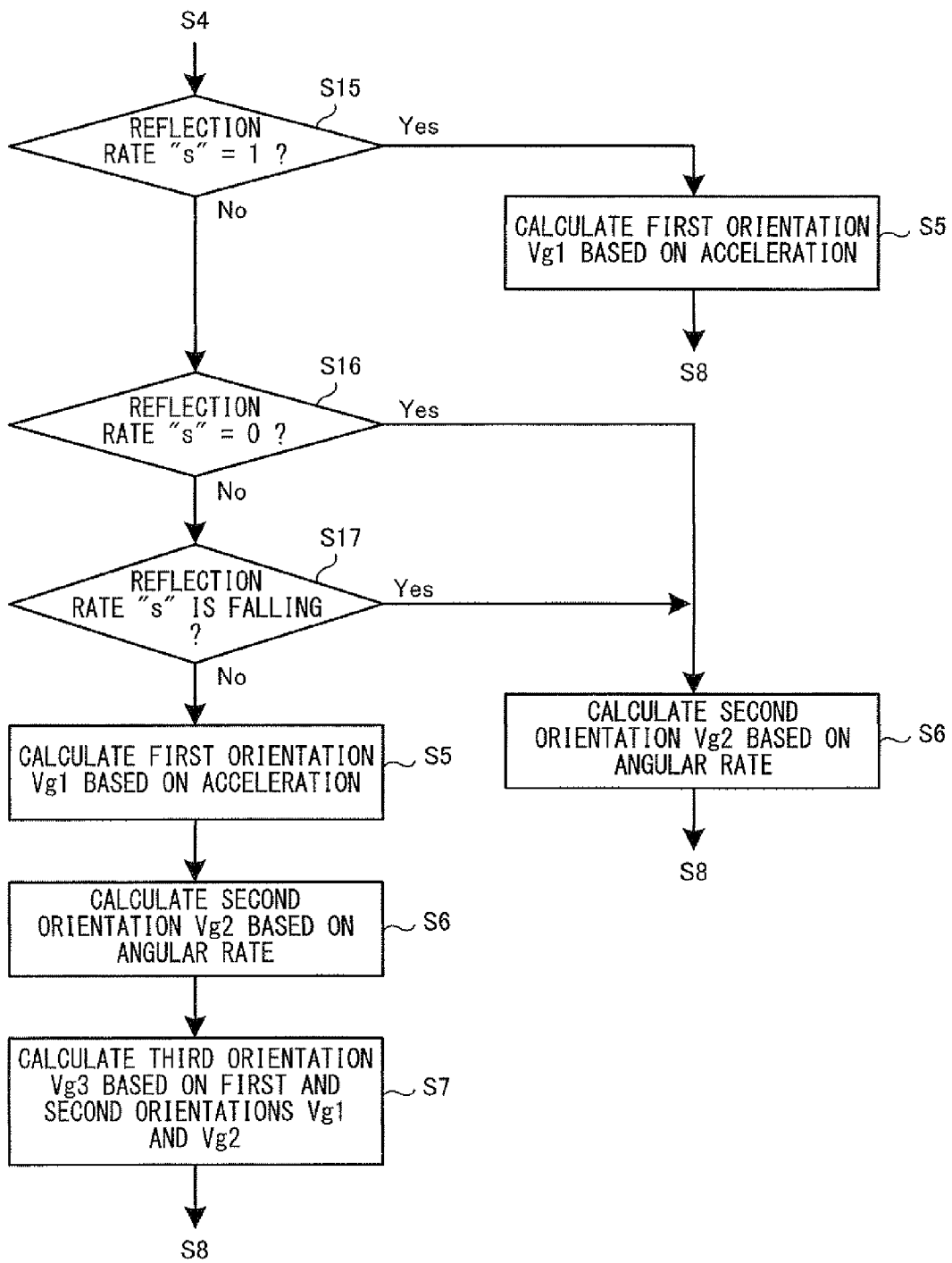
FIG. 12 is a flow chart illustrating a flow of a game process in a second variant of the embodiment.

FIG. 12 is a flow chart illustrating a flow of the game process in the second variant of the present embodiment. Note that FIG. 12 shows only the difference from the flow chart shown in FIG. 10. Also, in FIG. 12, the same process steps as in FIG. 10 are denoted by the same step numbers as in FIG. 10.

In the second variant, the process of step S15 is preformed after step S4. In step S15, the CPU 10 reads the reflection rate data 67 stored in the main memory, and determines whether or not the reflection rate s indicated by the reflection rate data 67 is "1". When the determination result of step S15 is affirmative, the process of step S5 is performed in the same manner as in the above embodiment. Specifically, in step S5, the CPU 10 calculates the first orientation (first gravitational vector Vg1) based on the acceleration vector Va. Following step S5, the process of step S8 is performed in the same manner as in the above embodiment. Accordingly, when the determination result of step S15 is affirmative, the first orientation based on the acceleration is used as the orientation of the input device 8 in the game process of step S8.

When the determination result of step S15 is negative, the process of step S16 is performed. In the process of step S16, the CPU 10 reads the reflection rate data 67 stored in the main memory, and determines whether or not the reflection rate s indicated by the reflection rate data 67 is "0". When the determination result of step S16 is affirmative, the process of step S6 is performed in the same manner as in the above embodiment. Specifically, in step S6, the CPU 10 calculates the second orientation (second gravitational vector Vg2) based on the angular rate ω. Following step S6, the process of step S8 is performed in the same manner as in the above embodiment. Accordingly, when the determination result of step S16 is affirmative, the second orientation based on the angular rate is used as the orientation of the input device 8 in the game process of step S8.

When the determination result of step S16 is negative, the process of step S17 is performed. In the process of step S17, the CPU 10 determines whether or not the reflection rate s is falling. Specifically, the CPU 10 reads the reflection rate data 67 and the previous reflection rate data 68 stored in the main memory, and determines whether or not the current reflection rate indicated by the reflection rate data 67 is lower than the previous reflection rate indicated by the previous reflection rate data 68. When the determination result of step S17 is affirmative, the process of step S6 is performed in the same manner as in the above embodiment. Specifically, in step S6, the CPU 10 calculates the second orientation (second gravitational vector Vg2) based on the angular rate ω. Following step S6, the process of step S8 is performed in the same manner as in the above embodiment. Accordingly, when the determination result of step S17 is affirmative, the second orientation based on the angular rate is used as the orientation of the input device 8 in the game process of step S8, as in the case where the determination result of step S16 is affirmative.

When the determination result of step S17 is negative, the processes of steps S5 to S7 are performed in the same manner as in the above embodiment. Specifically, the CPU 10 calculates the first orientation (first gravitational vector Vg1) based on the acceleration vector Va in step S5, the second orientation (second gravitational vector Vg2) based on the angular rate ω in step S6, and the third orientation (third gravitational vector Vg3) based on the first and second orientations in step S7. Following step S7, the process of step S8 is performed in the same manner as in the above embodiment. Accordingly, when the determination result of step S16 is affirmative, the third orientation calculated in step S7 is used as the orientation of the input device 8 in the game process of step S8.

Figure 13:
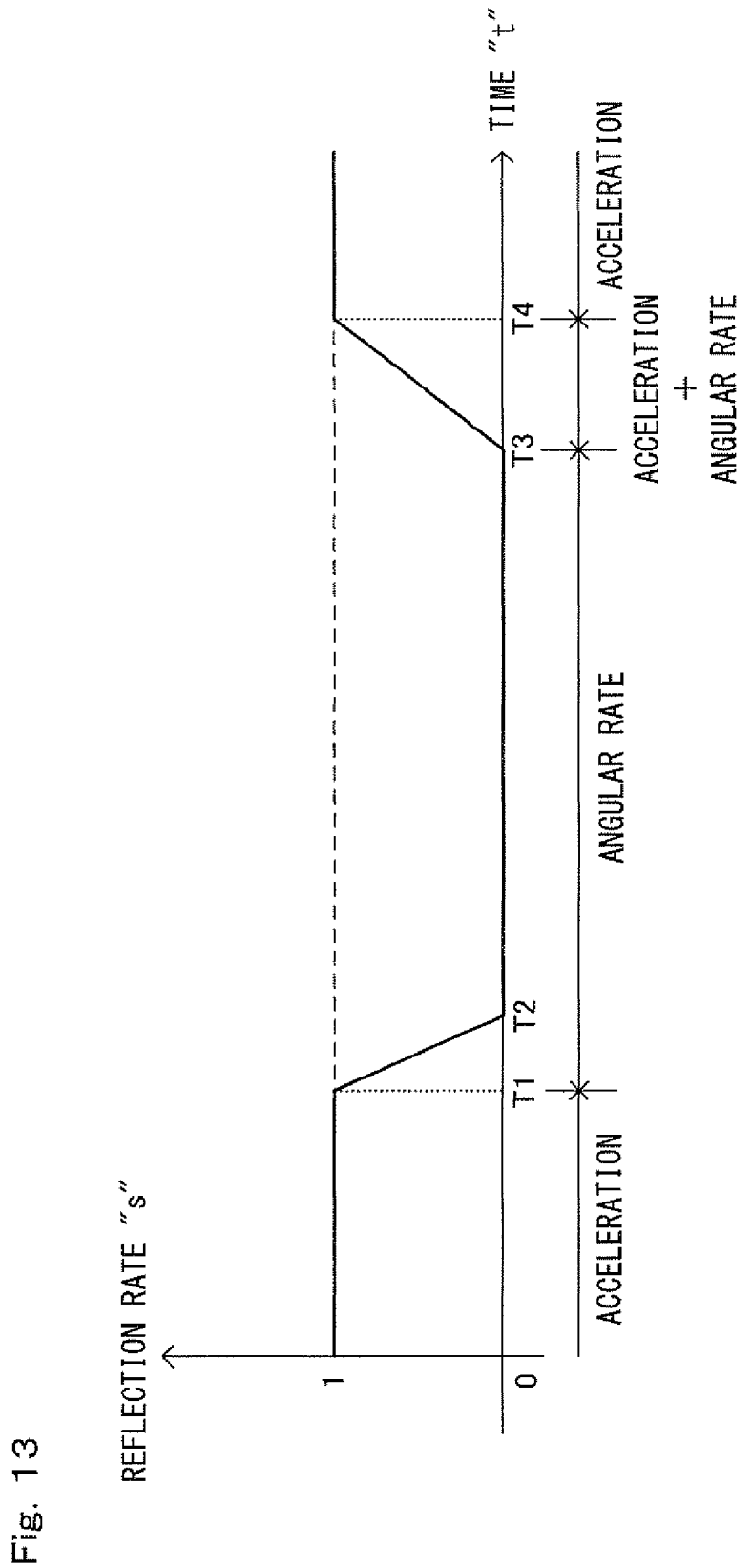
FIG. 13 is a diagram illustrating the relationship between a reflection rate s and methods used for orientation calculation in the second variant of the embodiment.

FIG. 13 is a diagram illustrating the relationship between the reflection rate s and the methods used for orientation calculation in the second variant of the present embodiment. In the second variant, the determination result of step S15 is affirmative during a period in which the reflection rate s is "1" (a period prior to time point T1 in FIG. 13). Accordingly, the CPU 10 performs steps S5 and S8, thereby calculating the orientation of the input device 8 using the first orientation based on the acceleration.

Also, when the reflection rate s falls from "1" (a period from time points T1 to T2 in FIG. 13), the determination results of steps S15 and S16 are negative, and the determination result of S17 is affirmative. Accordingly, the CPU 10 performs steps S6 and S8, thereby calculating the orientation of the input device 8 using the second orientation based on the angular rate. Also, when the reflection rate s falls to "0" (a period from time points T2 to T3 in FIG. 13), steps S6 and S8 are performed to calculate the orientation of the input device 8 using the second orientation based on the angular rate. In this manner, in the second variant, when the reflection rate s falls from "1" to "0", the orientation calculation method using the acceleration is switched directly (without going through the orientation calculation method using both the acceleration and the angular rate) to the orientation calculation method using the angular rate (see FIG. 13), as in the first variant.

On the other hand, when the reflection rate s rises from "0" (a period from time points T3 to T4 shown in FIG. 13), the determination results of steps S15, S16, and S17 are negative. Accordingly, the CPU 10 performs steps S5 to S8, thereby calculating the orientation of the input device 8 using the third orientation based on both the acceleration and the angular rate. In this manner, in the second variant, both the acceleration and the angular rate are used to calculate the orientation of the input device 8 during a transitional period in which the reflection rate s transitions from low to high, as shown in FIG. 13. Note that when the reflection rate s returns to "1" (a period subsequent to time point T4 shown in FIG. 13), the determination result of step S15 is affirmative, and therefore the CPU 10 performs steps S5 and S8, thereby calculating the orientation of the input device 8 using the first orientation based on the acceleration.

As described above, in the second variant, the orientation of the input device 8 is calculated using the third orientation only during the transitional period in which the reflection rate s transitions from low to high, whereas the orientation of the input device 8 is not calculated using the third orientation during the transitional period in which the reflection rate s transitions from high to low. In this manner, the game apparatus 3 may perform the orientation calculation method using both the acceleration and the angular rate only when the orientation calculation method using the angular rate transitions to the orientation calculation method using the acceleration. This is because in the case of calculating a new orientation by rotating the current orientation of the input device 8 in accordance with the angular rate as in the above embodiment (step S6), the orientation is unlikely to change suddenly when the orientation calculation method using the acceleration transitions to the orientation calculation method using the angular rate. Also, when the reflection rate s is falling, there is a possibility that the acceleration might be unreliable, and therefore, in some cases, the orientation might be more accurately calculated by using only the angular rate. On the other hand, when the orientation calculation method using the angular rate transitions to the orientation calculation method using the acceleration, there is a possibility that the orientation might change suddenly, and therefore, in the second variant also, the orientation is calculated using the third orientation because it is necessary to perform the orientation calculation process using both the acceleration and the angular rate (step S7), thereby preventing any sudden change in orientation.

As described above, in the second variant, as in the above embodiment, it is possible to prevent the orientation from changing suddenly when switching between the orientation calculation methods. Note that in the second variant, the CPU 10 performs the orientation calculation process using the third orientation during a period in which the reflection rate s rises from 0 to 1. Here, in another embodiment, the orientation calculation process using the third orientation may be performed during a predetermined period after a time point at which the reflection rate s transitions from a value lower than a predetermined value to a value equal to or greater than the predetermined value.

(Third Variant)

A third variant of the present embodiment will be described below. In the above embodiment, the game apparatus 3 sets the reflection rate s based on whether or not an output (acceleration vector Va) from the acceleration sensor 37 is reliable. In the third variant, the reflection rate s is set based also on whether or not the input device 8 (controller 5) has the gyroscope unit 7 (gyroscopes 55 and 56) attached thereto. The third variant will be described in detail below with reference to FIG. 14.

Figure 14:
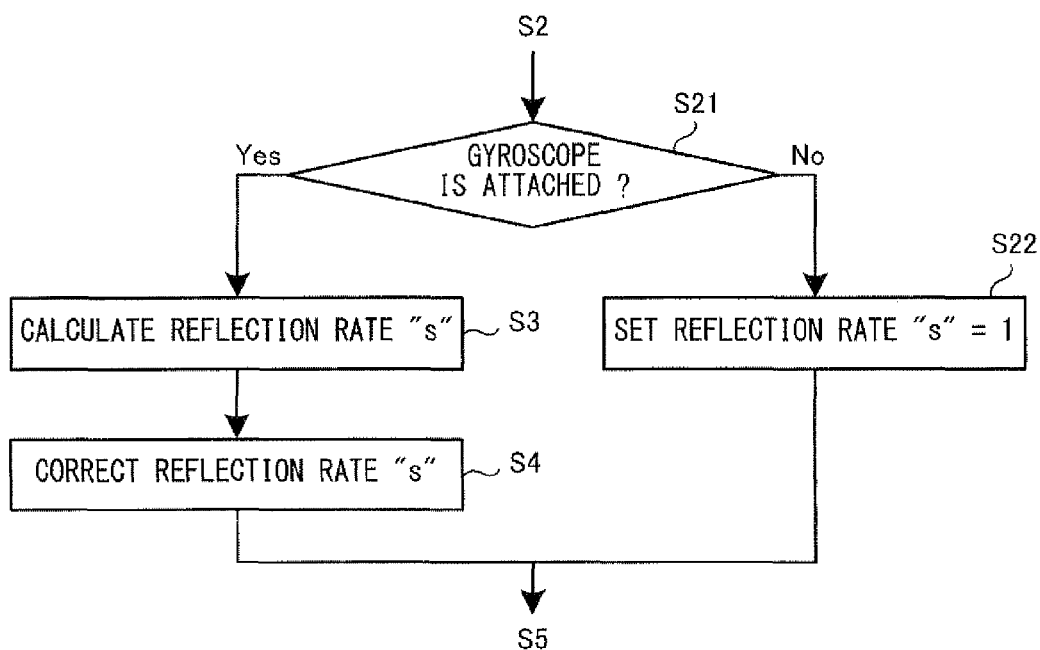
FIG. 14 is a flow chart illustrating a flow of a game process in a third variant of the embodiment.

FIG. 14 is a flow chart illustrating a flow of the game process in the third variant of the present embodiment. Note that FIG. 14 shows only the difference from the flow chart shown in FIG. 10. Also, in FIG. 14, the same process steps as in FIG. 10 are denoted by the same step numbers as in FIG. 10.

In the third variant, the process of step S21 is performed after step S2. In step S21, the CPU 10 determines whether or not the input device 8 has the gyroscope unit 7 attached thereto. Concretely, the CPU 10 reads the angular rate data 63 from the main memory, and determines whether the angular rate data 63 gives an indication of the value of the angular rate or an indication that the gyroscope unit 7 is not attached. The determination in step S21 can be considered to be a process for determining whether or not the orientation can be calculated based on the angular rate. When the determination result of step S21 is affirmative, the processes of steps S3 to S9 are performed as in the above embodiment. On the other hand, when the determination result of step S21 is negative, the process of step S22 is performed.

In step S22, the CPU 10 sets the reflection rate s to "1". Specifically, the content of the reflection rate data 67 stored in the main memory is updated so as to indicate "1". The process of step S22 is a process for performing the orientation calculation process using only the acceleration (without using the angular rate). Following the process of step S22, the processes of steps S5 to S9 are performed in the same manner as in the above embodiment. When the process of step S22 is performed, the reflection rate s is "1", and therefore in step S7, the first orientation based on the acceleration is calculated as the orientation of the input device 8.

As described above, in the third variant, the game apparatus 3 determines whether or not to employ the orientation calculation process based on the angular rate in accordance with whether or not the input device 8 has the gyroscope unit 7 attached thereto. As a result, it is possible to address both cases where the gyroscope unit 7 is attached or not attached to the input device 8 to which the gyroscope unit 7 is detachably provided as in the present embodiment. Specifically, when the gyroscope unit 7 is attached, the game apparatus 3 can calculate the orientation of the input device 8 through the above-described game process with high accuracy and high responsiveness, and even when the gyroscope unit 7 is not attached, it is still possible to calculate the orientation of the input device 8 in a simplified manner.

As described above, the present embodiment can be used as, for example, a game apparatus or program with a view to, for example, calculating an orientation of an input device with high responsiveness.

While the embodiment presented herein has been described in detail, the foregoing description is in all aspects illustrative and not restrictive. It is understood that numerous other modifications and variations can be devised without departing from the scope of the embodiment.

What is claimed is:

1. An orientation calculation apparatus for calculating an orientation of an input device including an acceleration sensor and an angular rate sensor based on at least acceleration data and angular rate data acquired from the input device, the apparatus comprising:
   a reflection rate setting unit for setting a reflection rate representing a degree by which an acceleration indicated by the acceleration data is reflected in the orientation;
   a first orientation calculation unit for calculating the orientation of the input device based on the acceleration indicated by the acceleration data and not based on the angular rate data, when the reflection rate is equal to or greater than a predetermined first threshold; and
   a second orientation calculation unit for calculating a change in the orientation of the input device based on an angular rate indicated by the angular rate data and not based on the acceleration data, when the reflection rate is less than a predetermined second threshold equal to or less than the first threshold.

2. The orientation calculation apparatus according to claim 1, wherein,
   the second threshold is less than the first threshold, and
   the apparatus further comprises a third orientation calculation unit for calculating the orientation of the input device so as to fall between the orientations calculated by the first and second orientation calculation units when the reflection rate is less than the first threshold and equal to or greater than the second threshold.

3. The orientation calculation apparatus according to claim 2, wherein
   the third orientation calculation unit calculates the orientation of the input device as a weighted average of the orientations calculated by the first and second orientation calculation units, the weighted average being obtained based on a weight corresponding to the reflection rate.

4. The orientation calculation apparatus according to claim 1, wherein
   the first threshold and the second threshold are equal,
   the first orientation calculation unit calculates the orientation of the input device when the reflection rate is equal to or greater than the first threshold, and
   the second orientation calculation unit calculates the orientation of the input device when the reflection rate is less than the first threshold.

5. The orientation calculation apparatus according to claim 1, further comprising a fourth orientation calculation unit for calculating the orientation of the input device so as to fall between the orientations calculated by the first and second orientation calculation units when the reflection rate is less than the first threshold and equal to or greater than the second threshold and is rising, wherein
   the second orientation calculation unit calculates the orientation of the input device based on the angular rate indicated by the angular rate data when the reflection rate is less than the second threshold or when the reflection rate is less than the first threshold and is falling.

6. The orientation calculation apparatus according to claim 1, wherein
the reflection rate setting unit calculates the reflection rate based on the acceleration indicated by the acceleration data.

7. The orientation calculation apparatus according to claim 6, wherein
the reflection rate setting unit calculates the reflection rate so as to be higher the lower the amount of change for the acceleration indicated by the acceleration data is.

8. The orientation calculation apparatus according to claim 6, wherein
the reflection rate setting unit calculates the reflection rate so as to be higher the closer the amount of change for the acceleration indicated by the acceleration data is to a gravitational acceleration.

9. The orientation calculation apparatus according to claim 6, wherein
the reflection rate setting unit repeatedly calculates the reflection rate, and corrects the reflection rate so as to fall between a currently calculated reflection rate and a previously calculated reflection rate when the currently calculated reflection rate is higher than the previously calculated reflection rate.

10. The orientation calculation apparatus according to claim 1, wherein
the reflection rate setting unit determines a degree of motion of the input device based on operation data acquired from the input device, and sets the reflection rate so as to be lower the more vigorously the input device is moved.

11. The orientation calculation apparatus according to claim 1, wherein
the angular rate sensor is detachable from the input device, and
the reflection rate setting unit determines whether or not the angular rate sensor is attached to the input device based on operation data acquired from the input device, and sets the reflection rate in accordance with the determination result.

12. The orientation calculation apparatus according to claim 1, wherein
the first orientation calculation unit repeatedly calculates the orientation of the input device, and calculates an orientation corresponding to a direction of gravity calculated as a weighted average of a direction of gravity corresponding to a previously calculated orientation and a direction of the acceleration, the weighted average being obtained based on a weight corresponding to the reflection rate.

13. A non-transitory computer-readable storage medium having stored therein an orientation calculation program to be executed by a computer in an orientation calculation apparatus for calculating an orientation of an input device including an acceleration sensor and an angular rate sensor based on at least acceleration data and angular rate data acquired from the input device, the program causing the computer to perform:
reflection rate setting for setting a reflection rate representing a degree by which an acceleration indicated by the acceleration data is reflected in the orientation;
first orientation calculation for calculating the orientation of the input device based on the acceleration indicated by the acceleration data and not based on the angular rate data, when the reflection rate is equal to or greater than a predetermined first threshold; and
second orientation calculation for calculating a change in the orientation of the input device based on an angular rate indicated by the angular rate data and not based on the acceleration data, when the reflection rate is less than a predetermined second threshold equal to or less than the first threshold.

14. The non-transitory storage medium according to claim 13, wherein
the second threshold is less than the first threshold, and
the orientation calculation program causes the computer to further perform a third orientation calculation for calculating the orientation of the input device so as to fall between the orientations calculated by the first and second orientation calculations when the reflection rate is less than the first threshold and equal to or greater than the second threshold.

15. The non-transitory storage medium according to claim 14, wherein
the third orientation calculation calculates the orientation of the input device as a weighted average of the orientations calculated by the first and second orientation calculations, the weighted average being obtained based on a weight corresponding to the reflection rate.

16. The non-transitory storage medium according to claim 13, wherein
the first threshold and the second threshold are equal,
the first orientation calculation calculates the orientation of the input device when the reflection rate is equal to or greater than the first threshold, and
the second orientation calculation calculates the orientation of the input device when the reflection rate is less than the first threshold.

17. The non-transitory storage medium according to claim 13, wherein
the orientation calculation program causes the computer to further perform a fourth orientation calculation for calculating the orientation of the input device so as to fall between the orientations calculated by the first and second orientation calculations when the reflection rate is less than the first threshold and equal to or greater than the second threshold and is rising, and
the second orientation calculation calculates the orientation of the input device based on the angular rate indicated by the angular rate data when the reflection rate is less than the second threshold or when the reflection rate is less than the first threshold and is falling.

18. The non-transitory storage medium according to claim 13, wherein
the reflection rate setting calculates the reflection rate based on the acceleration indicated by the acceleration data.

19. The non-transitory storage medium according to claim 18, wherein
the reflection rate setting calculates the reflection rate so as to be higher the lower the amount of change for the acceleration indicated by the acceleration data is.

20. The non-transitory storage medium according to claim 18, wherein
the reflection rate setting calculates the reflection rate so as to be higher the closer the amount of change for the acceleration indicated by the acceleration data is to a gravitational acceleration.

21. The non-transitory storage medium according to claim 18, wherein
the reflection rate setting repeatedly calculates the reflection rate, and corrects the reflection rate so as to fall between a currently calculated reflection rate and a previously calculated reflection rate when the currently calculated reflection rate is higher than the previously calculated reflection rate.

22. The non-transitory storage medium according to claim 13, wherein
the reflection rate setting determines a degree of motion of the input device based on operation data acquired from the input device, and sets the reflection rate so as to be lower the more vigorously the input device is moved.

23. The non-transitory storage medium according to claim 13, wherein
the angular rate sensor is detachable from the input device, and
the reflection rate setting determines whether or not the angular rate sensor is attached to the input device based on operation data acquired from the input device, and sets the reflection rate in accordance with the determination result.

24. The non-transitory storage medium according to claim 13, wherein
the first orientation calculation repeatedly calculates the orientation of the input device, and calculates an orientation corresponding to a direction of gravity calculated as a weighted average of a direction of gravity corresponding to a previously calculated orientation and a direction of the acceleration, the weighted average being obtained based on a weight corresponding to the reflection rate.

25. A method for calculating an orientation of an input device including an acceleration sensor and an angular rate sensor based on at least acceleration data and angular rate data acquired from the input device, the method comprising:
setting, using one or more computer processors, a reflection rate representing a degree by which an acceleration indicated by the acceleration data is reflected in the orientation;
calculating, using one or more computer processors, the orientation of the input device based on the acceleration indicated by the acceleration data and not based on the angular rate data, when the reflection rate is equal to or greater than a predetermined first threshold; and
calculating, using one or more computer processors, a change in the orientation of the input device based on an angular rate indicated by the angular rate data and not based on the acceleration data, when the reflection rate is less than a predetermined second threshold equal to or less than the first threshold.

\* \* \* \* \*